United States Patent [19]

Cook et al.

[11] Patent Number: 4,477,713

[45] Date of Patent: Oct. 16, 1984

[54] SIDEWALL-MATCHING ADAPTIVE CONTROL SYSTEM FOR WELDING

[75] Inventors: George E. Cook; A. Michael Wells, both of Nashville, Tenn.

[73] Assignee: CRC Welding Systems, Inc., Nashville, Tenn.

[21] Appl. No.: 397,006

[22] Filed: Jul. 9, 1982

[51] Int. Cl.³ .............................................. B23K 9/12
[52] U.S. Cl. ............................ 219/124.34; 219/125.12
[58] Field of Search ...................... 219/125.12, 124.34, 219/124.22

[56] References Cited

U.S. PATENT DOCUMENTS

| | | |
|---|---|---|
| 3,646,309 | 2/1972 | Smith, Jr. |
| 3,775,581 | 11/1973 | Sciaky |
| 3,777,115 | 12/1973 | Kazlauskas |
| 3,851,137 | 11/1974 | Verhagen |
| 3,904,846 | 9/1975 | Risberg |
| 4,019,016 | 4/1977 | Friedman |
| 4,095,077 | 6/1978 | Schneider |
| 4,151,395 | 4/1979 | Kushner |
| 4,158,124 | 6/1979 | Connell |
| 4,188,525 | 2/1980 | Merrick |
| 4,249,062 | 2/1981 | Hozumi et al. ............. 219/124.34 |
| 4,302,655 | 11/1981 | Edling |
| 4,302,656 | 11/1981 | Poth |
| 4,316,075 | 2/1982 | Isoya |
| 4,336,440 | 6/1982 | Cook et al. ................. 219/125.12 |

Primary Examiner—C. C. Shaw
Attorney, Agent, or Firm—Jones & Askew

[57] ABSTRACT

An adaptive control system for welding which senses the lateral profile of a weld joint while the welding electrode moves laterally across the joint, compares a first portion of the sensed lateral profile to a second portion of the sensed lateral profile, and then adjusts a welding parameter, such as the center of oscillation for tracking, the width of oscillation, and constant fill control, in response to the results of the comparison. One disclosed signal processing technique matches an average of data samples for the left portion of the weld seam to an average of data samples for the right portion. Another disclosed technique involves comparing an integrated signal corresponding to the leftward portion of the sensed lateral profile to an integrated signal corresponding to the rightward portion.

Another disclosed technique involves comparing an integrated sensed profile signal to a predetermined reference value which is based upon a reference signal. The reference signal comprises data representative of the prior history of the weld joint. The disclosed embodiments employ programmed microprocessors to provide horizontal cross-seam control and process the arc signal to remove undesirable noise. The system can adapt to changes in direction of the weld seam as well as changes in the width and shape of the profile of the weld seam.

27 Claims, 31 Drawing Figures

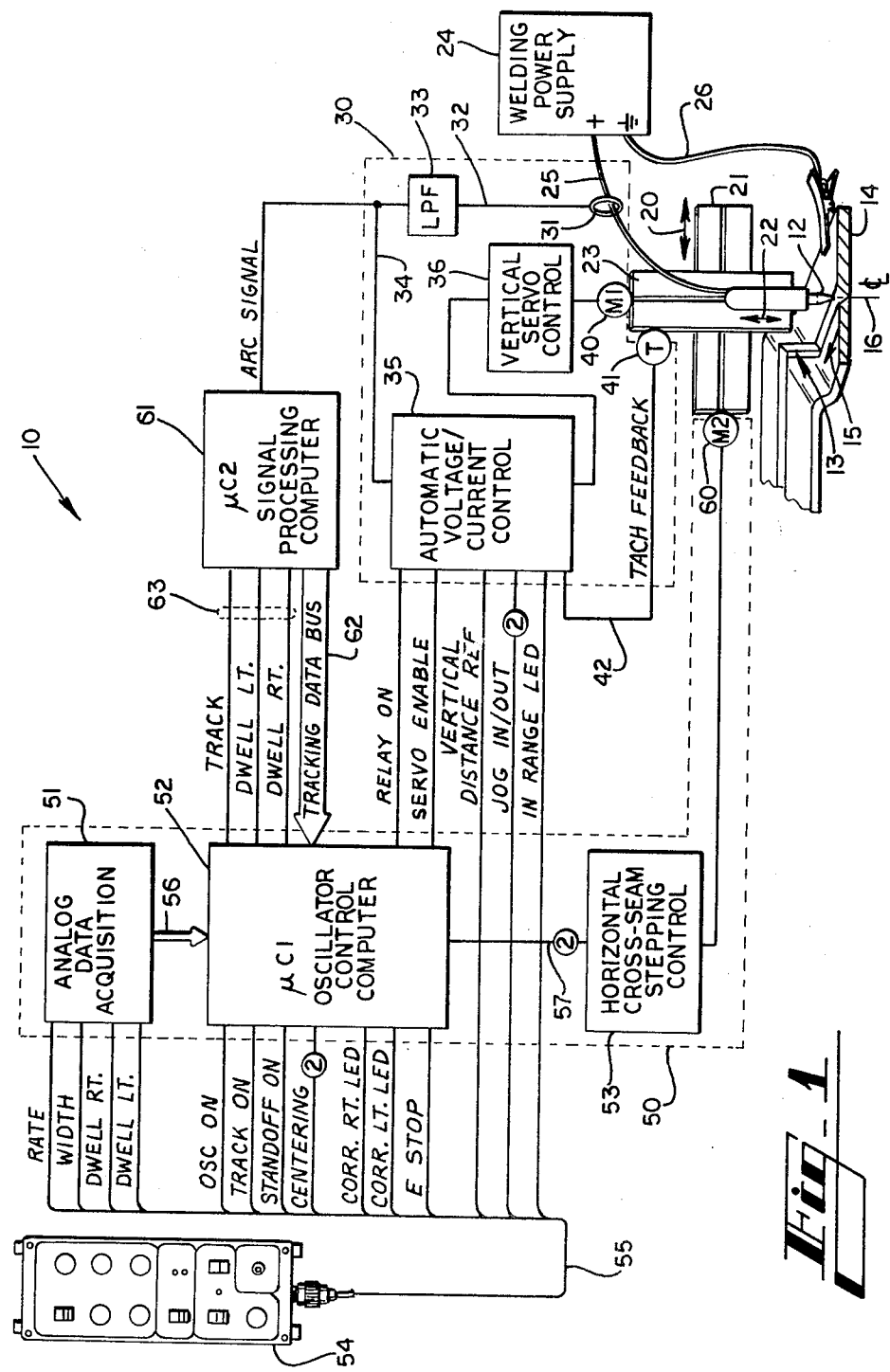
Fig_1

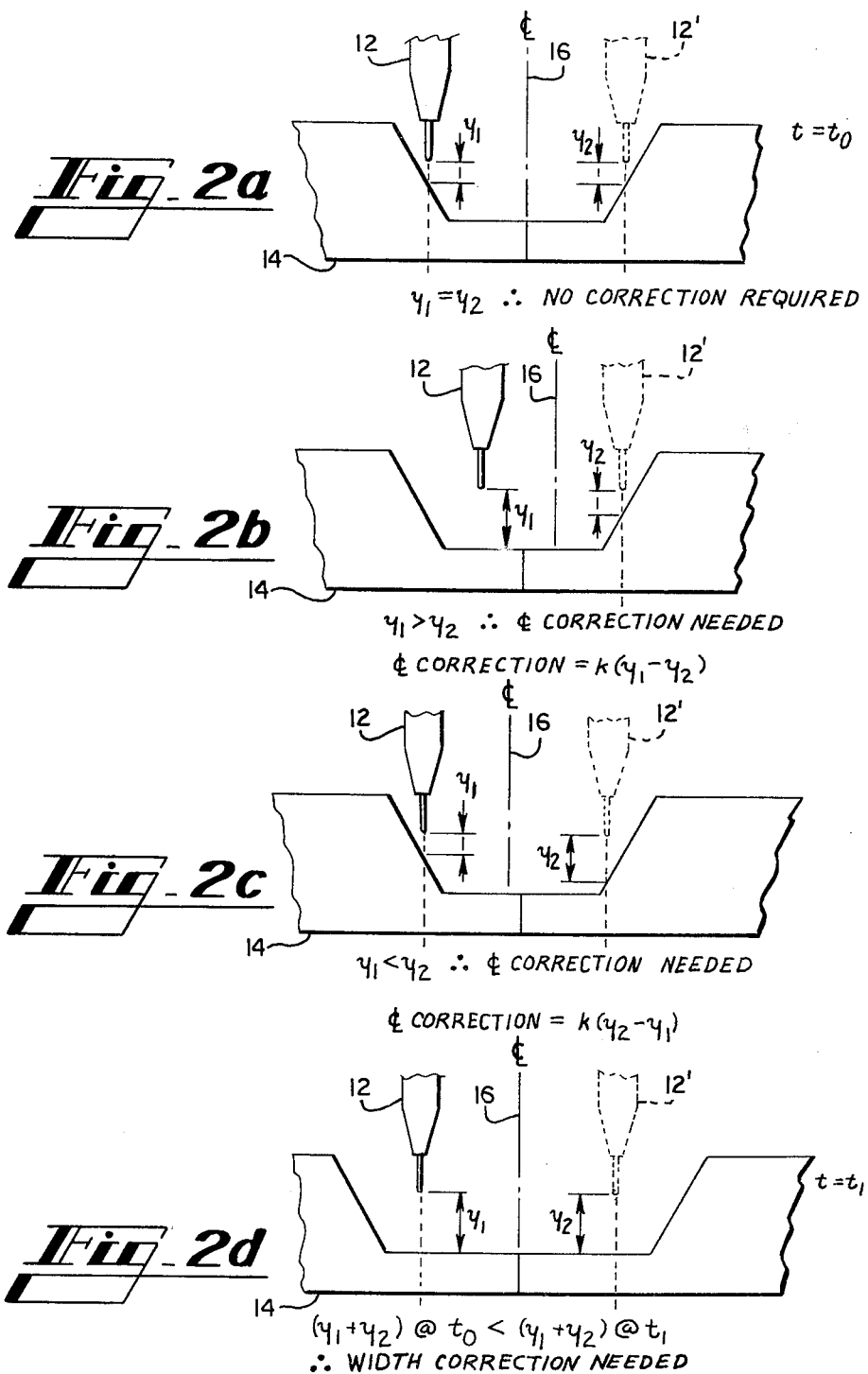

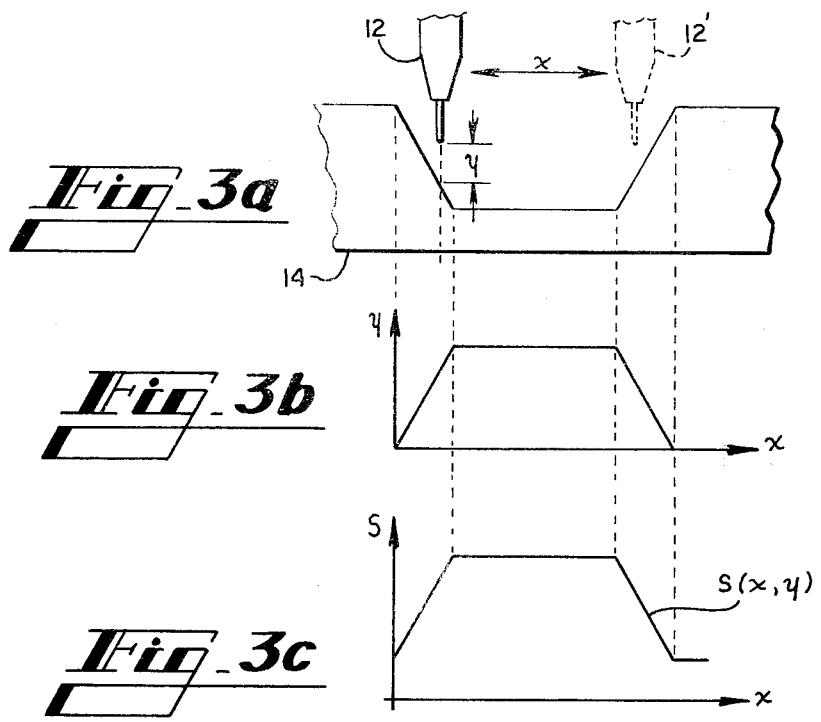
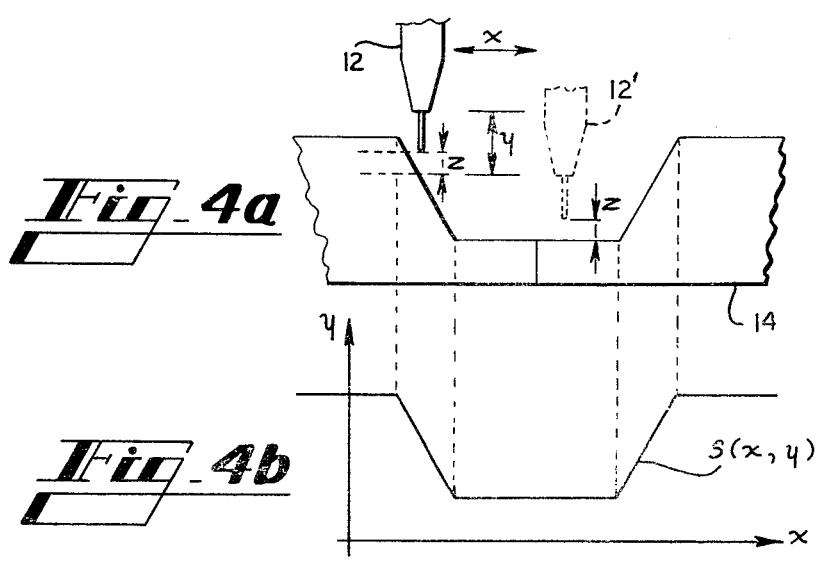
JOINT PROFILE ACQUISITION

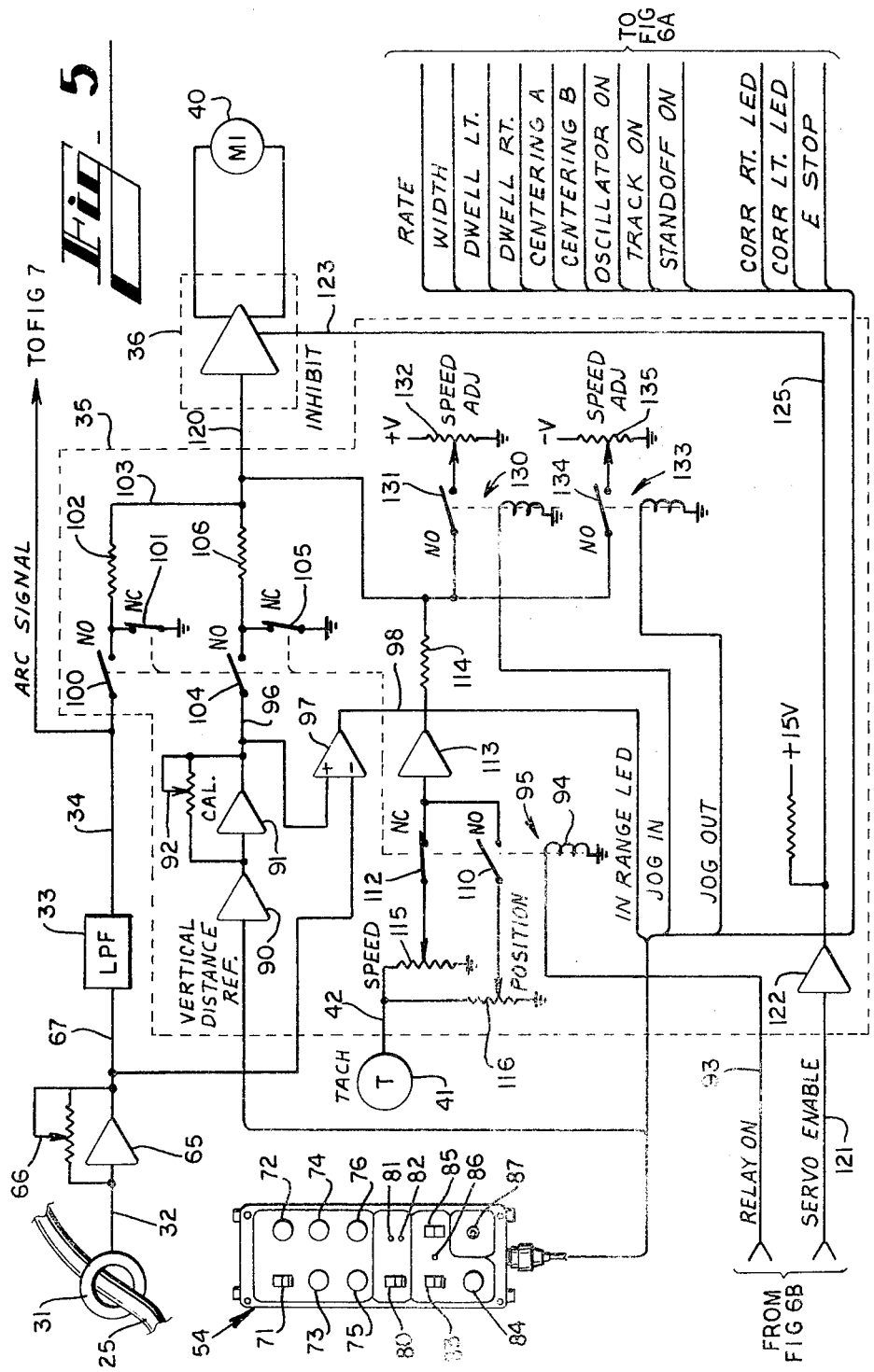

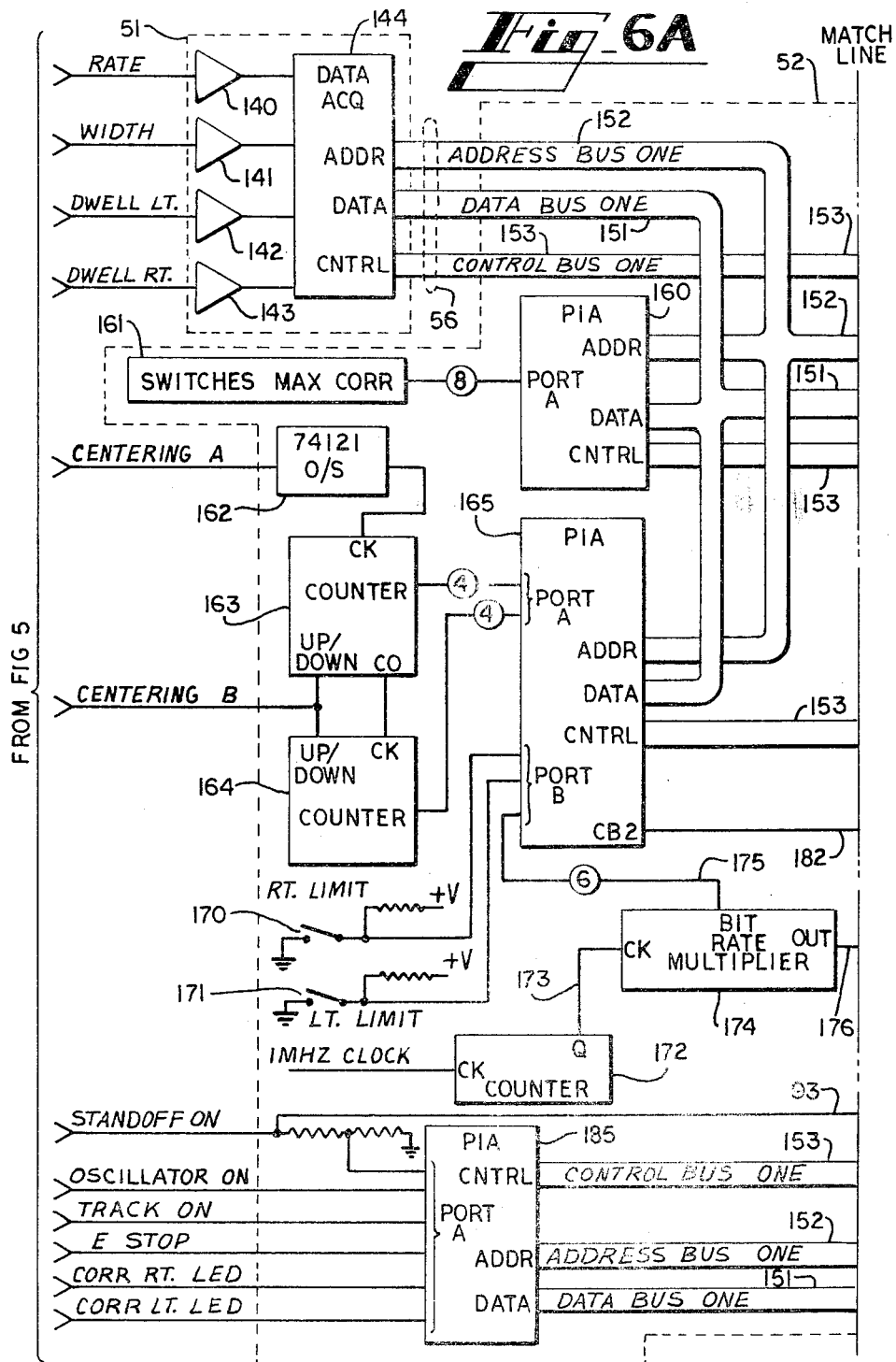

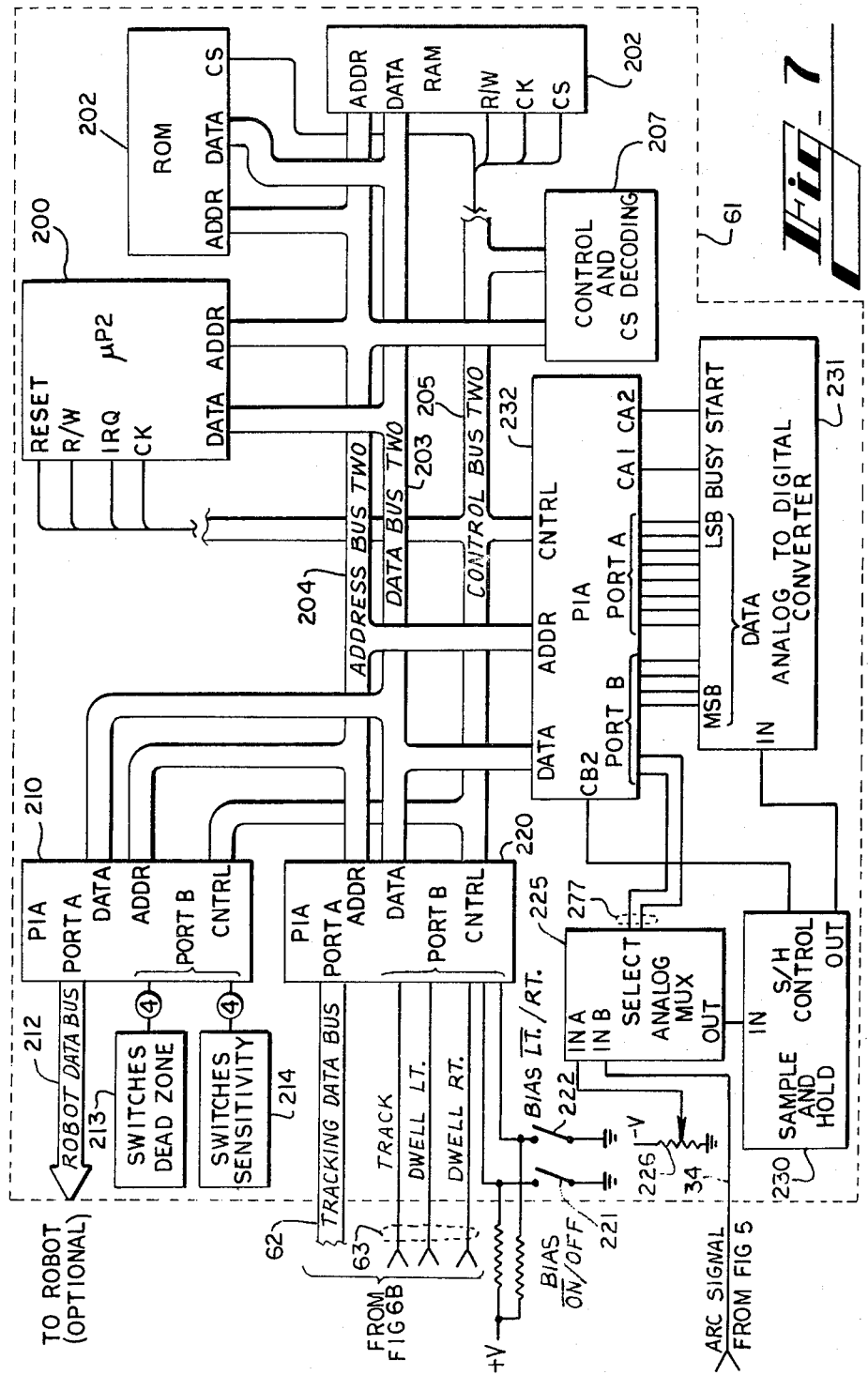

GENERAL OPERATION
SIDEWALL AVERAGING;
INTEGRATED AREA

GENERAL OPERATION
SIDEWALL AVERAGING;
INTEGRATED AREA

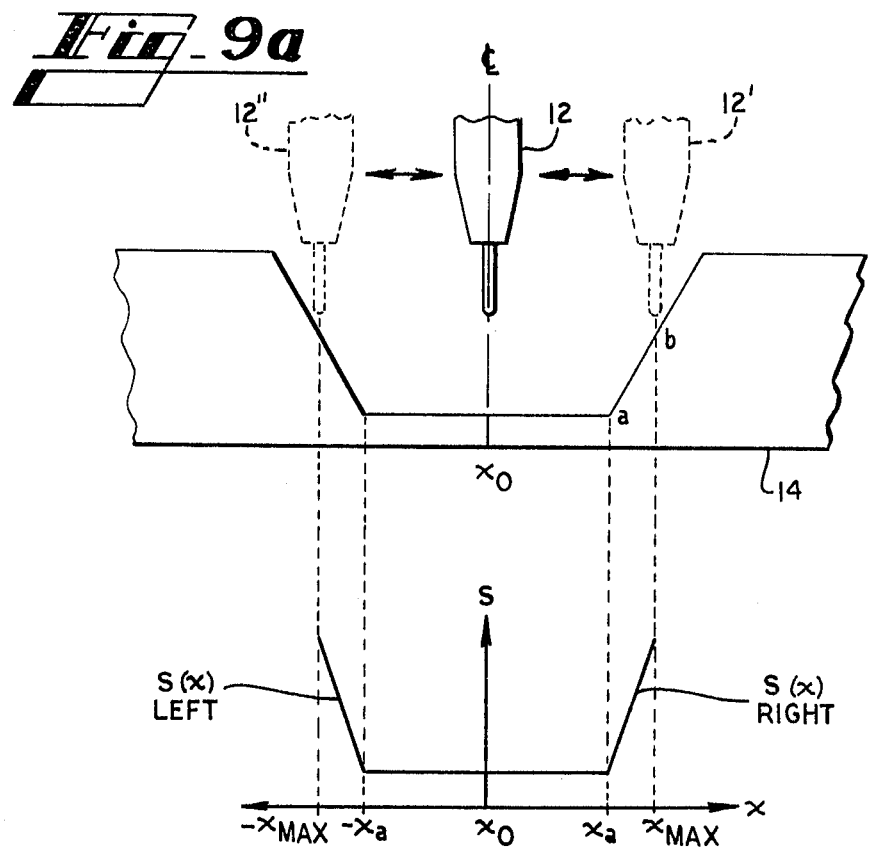
Fig. 9a
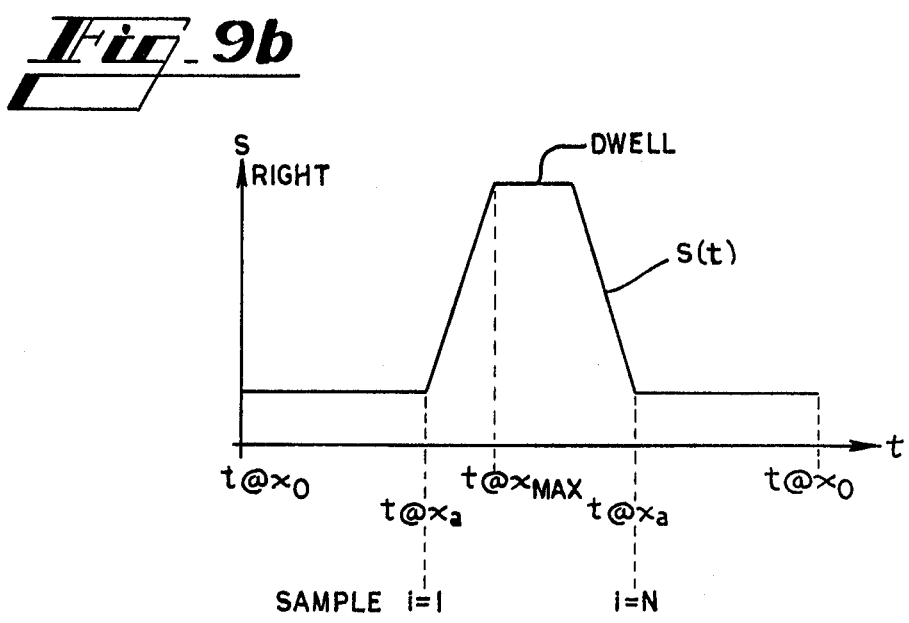
Fig. 9b
Fig. 9c          SIDEWALL AVERAGING

INTEGRATED AREA

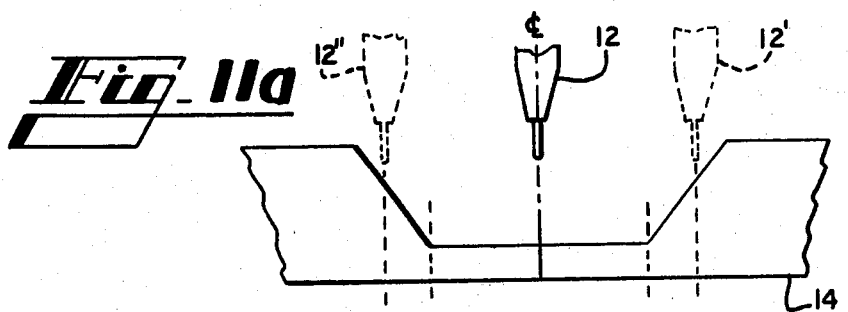
Fig_11a
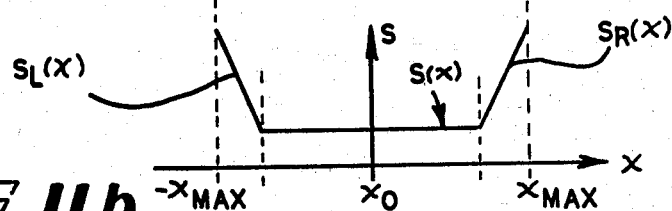
Fig_11b
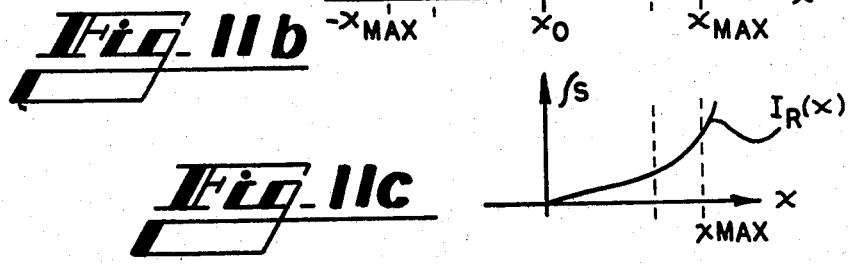
Fig_11c
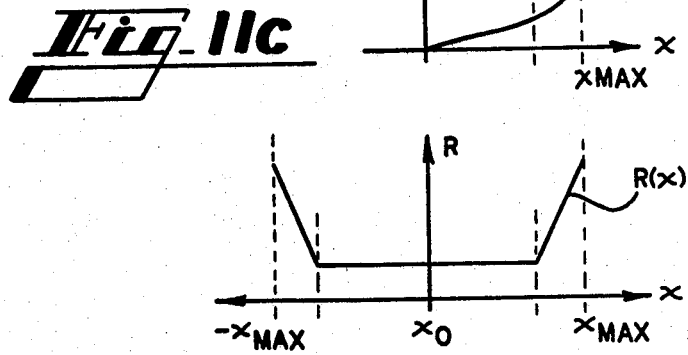
Fig_11d
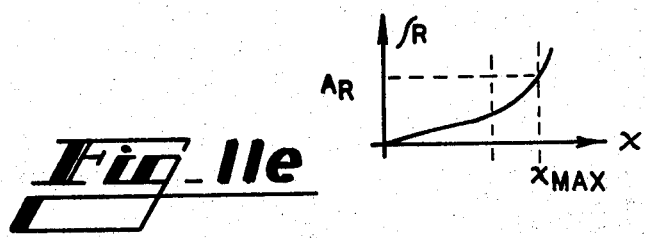
Fig_11e
INTEGRATED AREA REFERENCE SIGNAL

INTEGRATED AREA REFERENCE SIGNAL

GENERAL OPERATION – INTEGRATED AREA REFERENCE SIGNAL

SIDEWALL-MATCHING ADAPTIVE CONTROL SYSTEM FOR WELDING

BACKGROUND OF THE INVENTION

1. Field of the Invention

The present invention relates generally to arc welding control systems, and relates more particularly to adaptive welding systems which sense the characteristics of the seam being welded in order to adjust the center line of tracking of the welding electrode in the seam being welded, the width of oscillation, and the wire feed rate and/or travel speed for constant fill control.

2. Description of the Prior Art

In many arc welding applications, it is desirable to employ a system which guides an arc welding electrode along a joint or seam in a workpiece which is being welded. Such applications require the use of some type of weld joint tracking system, which generally senses the position of the welding electrode relative to the joint being welded and guides the electrode along the seam during the welding process. For example, tracking systems have been constructed which employ electromechanical probes within the joint, optical sensing devices which detect light emitted by a light source and reflected from the weld seam, and devices which detect a voltage or current signal characteristic of the distance between the arc electrode and the sidewall of the joint.

Each of the known methods for joint tracking has proven satisfactory for certain applications, but each present drawbacks depending on factors such as the constancy of the weld joint geometry, the unsuitability of employing either contacting or non-contacting transducers for sensing position, and the high control circuit noise levels produced by the welding power supplies.

The particular type of arc welding employed has a significant impact on noise levels which must be overcome, especially when weld tracking systems utilize the voltage or current signal measured between the workpiece and the weld electrode. Since the vertical electrode-to-workpiece spacings are known to be proportionally related to the arc voltage or current signal (depending upon the welding process), accurate measurements of the arc signal are required in order to provide reliable control. In gas tungsten arc welding (GTAW), the control circuitry senses the welding voltage which varies as a function of the distance between a nonconsumable tungsten arc electrode and the workpiece. Metal is deposited into the arc by a feed wire. In gas metal arc welding (GMAW), a consumable metal electrode is employed to deposit metal in the weld joint, and the arc current is sensed in order to derive tracking information. Submerged arc welding (SAW), plasma arc welding (PAW), and flux core arc welding (FCAW) are other arc welding systems in which tracking information may be derived from the voltage or current of the welding arc.

Of the above different types of arc welding systems, GTAW provides the "cleanest" signal because the electrode is always maintained a distance above the workpiece and never directly contacts the workpiece. GMAW, on the other hand, presents weld current waveforms which are often significantly noisier than the weld voltage waveforms encountered in GTAW. In GMAW, there are three different modes of operation, each of which produce different levels of noise in the current signal. In the spray transfer mode, the metal deposited leaves the consumable electrode in a fine mist of droplets which is directed to the workpiece in a fairly well-defined column and generally presents a signal waveform about as stable as the waveform in the GTAW process. In the dip transfer or short arc mode of GMAW, the electrode actually touches the workpiece on the order of 20–200 times per second and produces a short-circuit in the welding circuit. The frequency of short-circuiting is directly related to noise level, and varies as a function of the gas fed into the arc and capabilities of the power supply to provide current surges when the short-circuit occurs. When the short-circuit frequency reaches as low as 50 Hz, conventional noise removal circuitry invariably slows down the tracking process. In the globular transfer mode of GMAW, large globules of metal are deposited from the electrode to the workpiece at a frequency of between 10–20 Hz, but the frequency of short-circuiting varies widely and is very erratic. Consequently, it is even more difficult to acquire useful position information and still maintain an acceptable speed of tracking and welding.

Added to the noise level complication is the requirement that acceptable quality welds be produced. It is known to oscillate the electrode laterally across the groove in order to distribute metal across the seam as the electrode is moved along the path of the seam. Generally, the electrode must dwell for a period of time at the extremes of oscillation in order to ensure good weld tie-in at the side walls of the groove.

Some welding oscillation control systems remove noise by sampling the arc signal a plurality of times as the electrode dwells at the extremes of oscillation. For example, in the application entitled "Weld Tracking/Electronic Arc Sensing System", Ser. No. 054,517, filed July 3, 1979 by George E. Cook et al. now U.S. Pat. No. 4,336,440, there is disclosed a weld tracking system which senses the position of the welding electrode when the electrode has reached a predetermined lateral distance from the bottom of the weld groove (or "null") and is located at a given position relative to the sidewall of the weld groove. The arc signal is sampled a number of times at the lateral extension of oscillation while the electrode dwells at the extremes of movement. The samples are averaged, and the averages at each extreme are compared and a difference between the averages is calculated and used to re-establish the null position so as to minimize the difference in averages. The electrode is maintained at its predetermined distance by an automatic arc voltage control system. Normally, this automatic voltage control system is inactivated during oscillation to avoid cancelling the readings taken at the lateral extremes of oscillation.

The foregoing application and other prior art welding systems have not appreciated the need, in GMAW welding processes, to avoid excessively long dwell times which slow the welding. With the GTAW process, however, the information regarding position can be obtained in much less time because the signal bears less noise. Typically, 16 milliseconds is adequate time to dwell at the sidewalls in GTAW welding. In most GMAW welding, however, data should be obtained over several short-circuiting cycles in order to obtain a signal reliably indicative of the spacing between the arc electrode and the sidewall of the workpiece. For example, if the shorting frequency is of the order of 100 Hz (10 milliseconds per shorting cycle), data samples should be taken over approximately 5 cycles which requires about 50 milliseconds. If the shorting frequency drops to 25 Hz, or about 40 milliseconds per cycle, then taking data samples and averaging over four or five short-circuit cycles means dwelling for 160–200 milliseconds at the extremes of oscillation while the samples are taken and the average is computed.

It has been determined that a fixed period for sampling of between 100–200 milliseconds is generally sufficient to assure reliable data for short arc and other GMAW processes. For high speed welding, the welding apparatus cannot afford to dwell at the extremes of oscillation on the sidewalls for extended period of times to take samples and still maintain high welding speeds. At welding speeds of about 30 inches per minute, a period of dwell at the extremes on the sidewalls of 150 milliseconds is reasonable and allows a sufficient number of data samples to be taken. However, if welding speeds as great as 60 inches per minute are desired, the dwell time is effectively halved to about 75 milliseconds, which precludes taking a sufficient number of data samples to insure reliability. Consequently, the apparatus disclosed in the foregoing application is unable to attain high welding speeds due to its inherent inability to obtain sufficient data samples while the electrode is dwelling at the outermost extremes of oscillation.

In addition to dwell time problems, filtering of the arc signal slows down the ability of prior art systems to rapidly and reliably track. A low pass analog filter is used to filter undesirable noise in some prior art weld tracking equipment. Additional time is required for the signal to propagate through the analog filters prior to sampling. There must therefore be a coordination between the sampling and the output of the filter in order to accomplish the signal processing within a practical time limit. When the dwell time is added to the signal filter propagation delay time, there is a great risk that the conventional analog-filter apparatus cannot reliably track in GMAW at satisfactory speeds. Thus, unless alternative approaches are taken for GMAW processes, an automatic control system employing data sampling at the extreme positions of oscillation will result in unacceptably slow tracking speeds.

Prior art systems have generally failed to address problems which arise in GMAW processes because there is no time to take sufficient data samples at the extremes of oscillation to provide meaningful position information. If prior art systems are adapted to allow the taking of additional data at the extremes of oscillation, the quality of the weld will suffer because the electrode lingers for too long a period at the extremes of oscillation prior to departure.

It is now believed that there is a distinct advantage in taking data samples during the lateral movement of the electrode across the joint, due to the tendency to melt down the sidewall if the electrode dwells for an excessively long period of time. Prior tracking apparatus in which samples are taken only at the extremities of oscillation, does not utilize the time for deceleration and settling and acceleration of the electrode to obtain data samples. For all intents and purposes, the electrode resides near the extremes of oscillation during the periods of acceleration, settling, and deceleration, and additional data samples could conceivably be taken with the data samples taken while the electrode is settled in order to derive reliable position information.

The apparatus disclosed in the aforementioned application is unable to obtain data samples at any point in the oscillation cycle other than at the extreme lateral points of oscillation, because the microcomputer is busy controlling the lateral movement whenever the electrode is in motion. Only when the electrode has settled at the lateral extreme of oscillation can the microcomputer take data samples and perform the computations required to insure that a reliable position signal is being received.

The British published patent specification No. 1,517,481 of Takagi and Nishida also discloses a welding control apparatus which obtains position information only at or near the vicinity of the extremes of electrode movement. In one embodiment, the position signal is summed over a variable number n oscillations or weaving cycles, but it appears that a sample is taken of the signal only once per oscillation. In another embodiment, the position signal is integrated for a predetermined time period and then summed over n weaving cycles. However, the samples and integrations of the samples appear to occur only at the extreme ends of the oscillations. The overall welding speed is thus slowed due to this need to accumulate data over several oscillations in order to ensure reliable position information.

The patent to Kushner, U.S. Pat. No. 4,151,395, discloses another approach to controlling the lateral position of the electrode. A signal representative of the position of the arc electrode as it travels the weld path between opposite sides of the workpiece is first obtained by processing through a noise filter. The signal is then combined with a timing signal generated at the extremes of oscillation of the electrode to obtain a peak value indicative of the extreme lateral position of the electrode as it moves from side to side. These peak values are compared with each other or with other signals of a known value to obtain position control signals, such as the width of oscillation of the electrode or the correction of the centerline of travel of the electrode along the weld joint. This apparatus, however, also obtains arc signals only at the extremes of oscillation, and thus cannot rapidly and reliably track for GMAW processes.

The patent to Smith, U.S. Pat. No. 3,646,309, discloses a different approach to maintaining the welding electrode within the weld groove. The Smith apparatus includes an inhibit signal generator which is responsive to a preset arc voltage to generate an inhibit signal to stop the lateral oscillator drive when the electrode approaches too closely to the sidewalls of the weld groove. The inhibit condition is maintained until the oscillator drive is reversed to begin oscillation of the electrode toward the opposite sidewall. Although Smith maintains the electrode within a predetermined width of oscillation, the Smith device cannot respond to increases in the width of the weld groove by increasing the amount of lateral movement. Lateral movement is inhibited only if a preset value is reached prior to the arc electrode reaching the lateral extreme of movement. Moreover, the Smith apparatus would be unsuitable in GMAW processes because no means are disclosed for insuring that spurious noise signals do not provide false indications that the preset value has been reached. The Smith apparatus would therefore be generally unsuitable for use in GMAW processes because of a lack of noise filtering and signal processing capability to insure that meaningful position information has been acquired before action is taken.

SUMMARY OF THE INVENTION

The present invention provides an adaptive welding control system which overcomes the difficulties discussed above. An adaptive control system according to the present invention includes noncontacting means for sensing the lateral profile of the weld joint while the electrode is moving laterally across the joint, means for comparing a first portion of the sensed lateral profile of the joint to a second portion of the sensed lateral profile and for providing an error signal based on the difference therebetween, and means responsive to the error signal for adjusting a welding parameter such as centerline tracking, width of oscillation, constant fill control, and the like. In the preferred embodiment, the lateral profile is broken into two separate portions, one associated with the excursion of the electrode in one direction with respect to a predetermined center reference point, and the other, second portion being associated with the excursion of the electrode in the opposite direction. Thus, the first portion of the sensed lateral profile corresponds to one half of the weld joint profile while the second portion corresponds to the other half. In essence, then, the left half of the profile is compared to the right half to obtain the error signal.

The predetermined center reference point is the nominal center of oscillation of the electrode. Consequently, if there is a difference detected between the first portion of the sensed lateral profile and the second portion, it means that the electrode was not centered in the weld seam in the oscillation just completed, and the welding parameter requiring adjustment is the center of oscillation. In a similar fashion, if the entire sensed lateral profile for the present oscillation differs from the entire sensed profile for a prior oscillation, the width of the seam has changed, and the welding parameter needing adjustment is the width of oscillation for the next pass.

Briefly summarized, the preferred embodiment of the present invention includes means for deriving an arc signal having a magnitude related to the distance between the arc electrode and the surface of the joint to be welded; signal sampling circuitry which obtains a plurality of digitized samples of the arc signal during the entire excursion of the electrode from one extreme to the other, as well as during dwell periods, thereby providing a lateral profile signal; a memory for storing the digitized samples; signal processing circuitry for providing an error signal based upon computations using the samples of the lateral profile signal, and control circuitry which adjusts welding parameters based on the error signal. The signal processing and control circuitry preferably comprises a programmed digital microcomputer which performs the necessary computations using the samples as data, thereby removing undesirable noise components and providing the signals for adjusting the welding parameters.

The signal processing circuitry plays an important role in the operation of the present invention, and performs what essentially amounts to digital filtering of the arc signal. Since the presence of noise in the arc signal is the principal reason why prior art systems have been unable to provide satisfactory adaptive control, the present invention is directed to providing an apparatus which successfully derives arc position information from the arc signal.

Several different signal processing techniques are disclosed herein, each of which provides a different method for processing the arc signal to ensure reliable arc position information. In one technique, the system averages the magnitude of the arc signal while the electrode is traversing the weld groove and as the electrode is approaching an extreme of oscillation and provides a first average signal. A second average signal is obtained when the electrode traverses the weld groove in the opposite direction and approaches the opposite sidewall. The oscillation center is then adjusted as a function of the difference between the first average signal and the second average signal.

In a second technique, the system obtains a first integral signal by integrating the arc position signal while the electrode is approaching an extreme of movement towards the first sidewall, obtains a second integral signal by integrating the arc position signal while the electrode is approaching the opposite extreme of oscillation, and provides correction for the center of oscillation by determining the difference between the two integral signals.

In both of the above techniques, control of welding parameters related to the width of the seam being welded, such as the oscillation width, is effectuated by comparing each sample of the arc signal to a minimum arc or "min arc" value, which represents the closest desired approach to the sidewall. If the min arc is not encountered, the oscillation continues further outward toward the sidewall, until either the min arc is reached or an initially pre-set maximum excursion is reached. The pre-set maximum excursion for the next oscillation is either increased or decreased, depending upon whether the pre-set maximum excursion or the min arc, respectively, was encountered.

Alternatively, control of width-related welding parameters is effectuated by comparing the sum of the signals for the left and right sidewalls (as opposed to the difference of the signals) to the sum of signals for the left and right sidewalls taken during one or more previous oscillations. If the sum of the signals for the present oscillation exceeds the sum for the prior oscillation, the seam has widened, and conversely if the sum of the signals for the present oscillation is less, the seam has narrowed. Appropriate adjustments are then made to the width-related parameters.

In a third signal processing technique, the system accomplishes simultaneous weld seam tracking and width of oscillation correction by forcing the oscillation to occur between boundaries which are pre-set to an initial maximum. This maximum represents the closest desired approach to the sidewall. As in the above techniques, data samples are taken across the entire lateral cross-section of the seam. The arc signal is integrated for each data sample taken for the leftward portion of the oscillation and for the rightward portion as the initial boundaries are approached. The integrated arc signal is then compared to a reference value which corresponds to the expected integral if the initial boundary has been reached.

The sampling and derivation of the integrated arc signal is repetitively performed. When the arc signal integral equals the reference value, the sidewall has been reached, and the direction of oscillation is reversed. For this third technique, means are provided for adjusting the reference value based on the recent prior history of the weld groove, as manifested by data samples taken and stored during earlier oscillations. Upon the completion of any given oscillation, the lateral profile data is mathematically combined with data from prior oscillations by averaging or like methods, and the reference value is recomputed. A changing width may thus be detected and adapted to.

Advantageously, the third signal processing technique may be used in conjunction with the first and second techniques to provide an alternative width adjustment approach. Centering and width correction are thus automatically provided since the electrode is forced to oscillate between outer boundaries, which may vary according to the geometry of the weld groove.

All of the above embodiments contemplate that data corresponding to all or at least that portion of the cross-sectional geometry of the weld groove between initially pre-set boundaries will be sampled and stored in a memory and then used as the basis for computations of the mathematical quantities used in the signal processing. This contrasts with prior art systems in which data is taken and used only at the extremes of oscillation, or only at places where maximum or minimum values of the arc signal are encountered.

In the technique involving use of the reference signal, the reference signal may be obtained analytically, based upon the known characteristics of a seam to be welded. Alternatively, the electrode may be placed in a test seam which is tracked purely for data gathering purposes under close supervision, or the reference signal may be obtained by taking data during a predetermined number of oscillations at the start of the weld and defining this initial data as the reference signal data. A running average based on data from a predetermined number of oscillations may then be maintained and periodically updated as the seam is tracked.

The disclosed embodiment of the present invention is preferably constructed using microprocessor circuitry due to the ability of such circuits to perform the rapid and accurate mathematical computations which are necessary to accomplish the objectives of the system. Two separate microprocessor systems are utilized in the disclosed embodiment. One microprocessor is dedicated to control the horizontal position of the electrode, while the other performs the digital signal processing necessary to remove undesirable noise components from the arc position signal. Advantageously, the present invention allows the accumulation of data samples of the arc signal while the electrode is moving between the extremes of oscillation, as opposed to prior art systems in which the arc signal is sampled only at the lateral extremes of oscillation.

The present invention incorporates a horizontal cross seam stepping motor which oscillates the electrode within the weld groove, and a vertical servomotor which employs an automatic current/voltage control to maintain the electrode a predetermined distance from the workpiece at certain portions of the welding cycle. Arc signals are obtained from the electrode and provided to the signal processing and control circuitry, which may be located remotely from the horizontal and vertical motor assemblies.

The horizontal and vertical motor assemblies are intended to be mounted as a unit in a welding system which can move the entire unit longitudinally along the path of a weld seam. For example, the present invention is particularly adaptable for use in robot welding systems which sense the presence of a workpiece and automatically move the welding apparatus into proximity to the seam to be welded. Once in proximity to the seam, the present invention can automatically track the seam both vertically and horizontally as the electrode is moved longitudinally along the seam.

The use of separate microcomputers in the present invention, one for control of the lateral cross-seam oscillator and one for signal processing, allows adaptive control at speeds heretofore unattainable. The present invention thus does not suffer from the restriction that samples can only be taken at the lateral extremes of oscillation, as in the Cook et al. application Ser. No. 054,517.

Accordingly, it is an object of the present invention to provide an improved adaptive control system for welding.

It is another object of the present invention to provide an adaptive welding control system which is suitable for use in all major types of electrical welding processes including gas metal arc welding, gas tungsten arc welding, submerged arc welding, flux core arc welding, plasma arc welding, and the like.

It is another object of the present invention to provide an adaptive welding control system which guides an arc welding electrode along a longitudinal path to be welded and which is adaptable to variations in direction and width of the weld joint.

It is another object of the present invention to provide an adaptive welding control system which insures high quality welds by maintaining a proper electrode-to-workpiece spacing as the electrode is moved along the longitudinal path of a weld joint.

It is another object of the present invention to provide an adaptive welding control system which successfully isolates welding electrode position information from the extremely noisy arc welding voltage or current signal and uses this position information to track the electrode along a weld joint.

It is another object of the present invention to provide an adaptive welding control system which is not limited to obtaining welding electrode position information when the welding electrode has reached the extremes of oscillation in the weld joint.

It is another object of the present invention to provide an adaptive welding control system which detects and utilizes welding electrode position information derived from a welding parameter such as voltage or current obtained over a greater proportion of the oscillation of the electrode across the seam than merely at the extremes of welding electrode oscillation.

It is another object of the present invention to provide an adaptive welding control system which obtains welding position information as the welding electrode approaches the lateral extremes of oscillation as well as during dwell periods at the extremes.

It is another object of the present invention to provide an adaptive welding control system which uses all the data derived during the cross seam oscillation as opposed to only the high and low extreme values of the data.

Is is another object of the present invention to provide an adaptive control system for welding which corrects the centerline of oscillation of the electrode as a function of the difference between a signal corresponding to the left portion of the weld seam and a signal corresponding to the right portion of the weld seam.

It is another object of the present invention to provide an adaptive control system for welding which corrects the centerline of oscillation of the electrode and the width of oscillation by comparing the integral of the electrode position signal to the integral of a stored reference signal characteristic of the recent prior history of the weld seam.

It is another object of the present invention to provide an adaptive welding control system which continuously accumulates arc signal data characteristic of the profile of a weld joint and uses this data as a reference by which the system may guide the welding electrode within the weld joint as the electrode is moved longitudinally along the weld joint.

It is another object of the present invention to provide an adaptive welding control system which continuously updates a previously-derived weld joint profile with new information representative of a possibly changing weld profile, and adapts to the new weld joint profile to guide the weld electrode longitudinally along the path of the weld joint.

It is another object of the present invention to provide an adaptive welding control system which compares information obtained from the arc voltage or current with data pertaining to the prior history of the weld joint profile, and generates a correction signal which is used to adjust welding parameters such as the centerline of arc electrode oscillation within the weld joint and width of oscillation as the electrode is moved longitudinally along the weld joint.

It is another object of the present invention to provide an adaptive welding control system which corrects the centerline of oscillation of the electrode within the weld joint, adjusts the width of oscillation of the electrode within the weld groove to match or follow variations in the width of the joint, and controls the wire feed rate and/or electrode travel speed for the purpose of maintaining uniform volume of fill or uniform depth of fill.

It is another object of the present invention to provide an adaptive welding control system welding which utilizes advanced digital signal processing technology in order to insure the removal of reliable weld electrode position information from the highly noisy electrical environment of arc welding current or voltage signals.

These and other objects, advantages, and features of the present invention may be more clearly understood by reference to the following description of preferred embodiments and by examination of the accompanying drawings.

BRIEF DESCRIPTION OF THE DRAWINGS

FIG. 1 is schematic block diagram of a preferred embodiment of the adaptive control system according to the present invention.

FIGS. 2a-2d are partial cross-section views of typical weld joint seam showing electrode positions requiring center line and width correction.

FIGS. 3a-3c are cross-section views which demonstrate a signal waveform characteristic of one method of obtaining joint profile information.

FIGS. 4a-4b are cross-section views which demonstrate another method of obtaining weld joint profile information.

FIG. 5 is a detailed schematic diagram of the automatic voltage/current control circuitry, vertical servo control, and operator pendant of the preferred embodiment.

FIG. 7 is a detailed schematic diagram of the signal processing circuitry of the preferred embodiment of the present invention.

FIGS. 9a-9c show a partial cross-section of a typical weld joint and signals illustrating the sidewall averaging signal processing approach.

FIGS. 11a-11e show a partial cross-section of a typical weld joint and signals illustrating the integrated area reference signal processing approach.

DETAILED DESCRIPTION OF THE PREFERRED EMBODIMENT

Figure 6B:
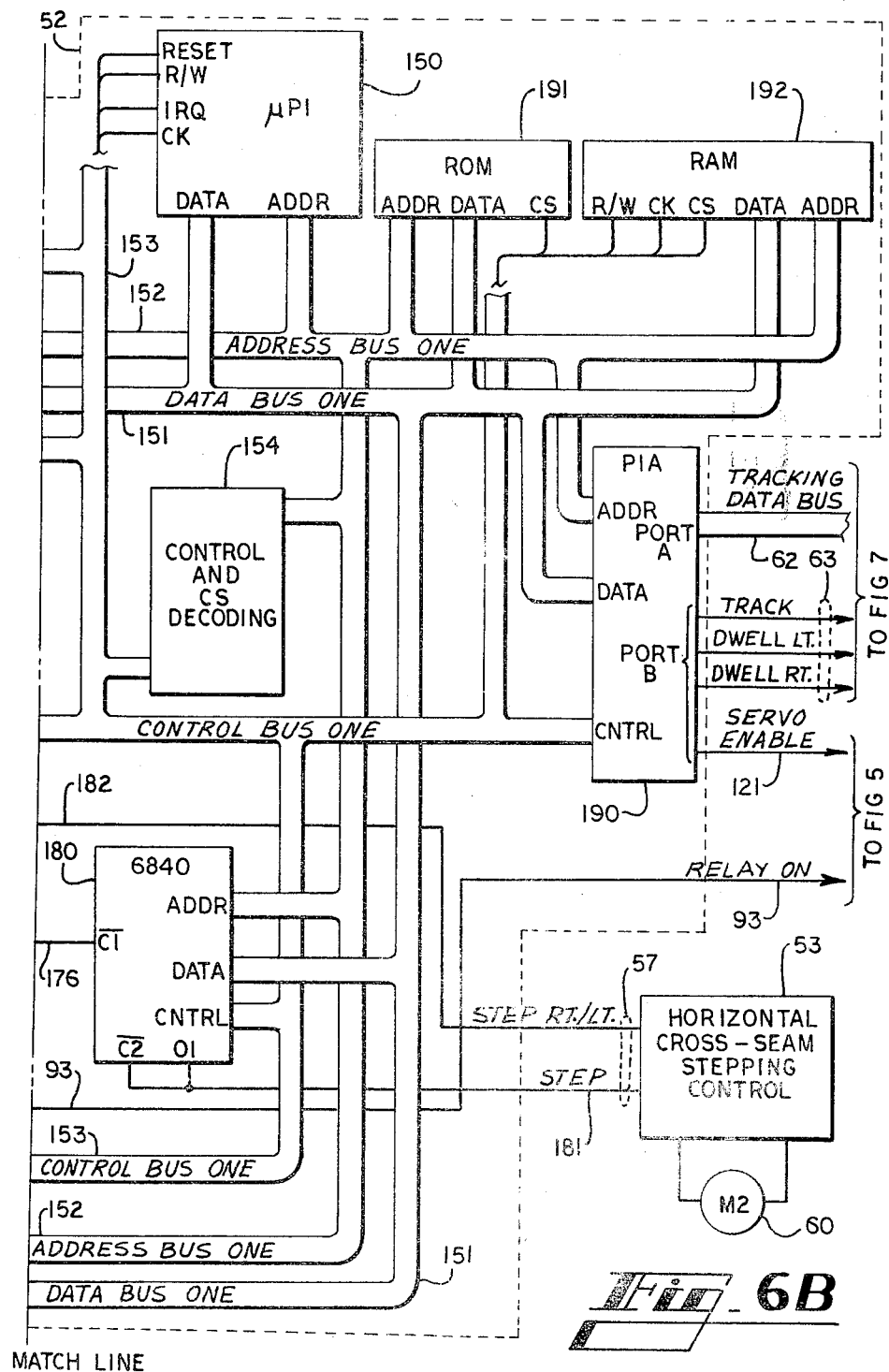
FIG. 6 is a detailed schematic diagram of the oscillator control circuitry, analog data acquisition circuitry, and cross-seam control circuitry of the preferred embodiment.

Turning now to the drawings, in which like numerals indicate like elements throughout the several views, a preferred embodiment 10 of the adaptive control system of the present invention is shown in block diagram form in FIG. 1. The system controls the movement in the horizontal and vertical directions of an arc welding electrode 12 as the electrode is moved longitudinally along a path 13 in a workpiece 14. The direction of travel of the electrode 12 along path 13 is indicated by arrow 15.

In order to assure a high quality weld, the welding electrode is laterally oscillated within the weld groove in the workpiece in the direction indicated by arrow 20, about a centerline of oscillation 16. In the preferred embodiment, the lateral oscillation is accomplished by a cross-seam slide 21 which carries the electrode 12 laterally back and forth across the seam.

In order to achieve a quality weld, it is also necessary to move the electrode vertically towards and away from the workpiece, in the direction indicated by arrow 22. The spacing between the tip of the electrode 12 and the workpiece must be carefully controlled in order to insure proper voltage drop or current flow between the electrode and the workpiece. In the preferred embodiment, the vertical spacing of the electrode is maintained by a vertical slide 23, which those skilled in the art will realize incorporates an appropriate mechanism for moving the electrode vertically.

It will be understood that the cross-seam slide 21 and the vertical slide 23 may be mounted as a unit in a suitable apparatus capable of transporting the assembly longitudinally along the path which is to welded. For example, the present invention may be conveniently employed with robot systems which are designed to transport welding equipment along predetermined paths for welding. The present invention, when used with such a robot welding system, relieves the robot of the task of tracking the electrode along the weld seam.

Power for the arc welding is provided by a welding power supply 24 which provides current on cable 25 to electrode 12. A ground cable 26 is attached to the workpiece 14 in the conventional manner and returns the current to the welding power supply 24.

The preferred embodiment 10 includes several control and signal processing circuits which perform the signal processing and control functions necessary to successfully track the weld seam. The vertical spacing of electrode 12 above the workpiece is controlled by vertical position control circuitry, the basic components of which are shown enclosed within the block 30. An arc current/voltage detector 31 detects the basic signal waveform produced by the arc on cable 25. In welding systems using gas metal arc welding, a Hall effect sensor may be used to detect the arc signal.

The arc signal is provided on line 32 to a conventional low-pass filter 33 which in the preferred embodiment is a conventional third order Butterworth low-pass filter having a cutoff frequency of about 3 Hz for GMAW processes and about 36 Hz for GTAW processes. Those skilled in the art will appreciate that other types of analog low-pass filters may successfully be employed for filter 33. Furthermore, filters having higher cutoff frequencies may be employed if more filtering is done digitally. In some applications, the low pass filter will be unnecessary and may be omitted, since the signal processing ability of the present invention successfully removes noise which might obscure useful position information.

The output of filter 33, when employed, is provided on line 34 to the input of automatic voltage/current control circuit 35. The output of automatic voltage/current control 35 is provided to a vertical servo control circuit 36, which provides control signals and power for vertical servomotor 40. Servomotor 40 moves electrode 12 vertically towards and away from workpiece 14. Detector 31, filter 33, control circuits 35 and 36, and servomotor 40 comprise a closed loop servomechanism which maintains the spacing between the electrode 12 and workpiece 14. A conventional tachometer 41 senses the direction and speed of electrode 12 as the electrode moves vertically, and provides a feedback signal on line 42 to automatic voltage/current control 35 and thereby also closes the servomechanism loop.

The horizontal motion of electrode 12 is controlled by horizontal position control circuitry 50, which includes analog data acquisition circuitry 51, electrode oscillator control computer 52, and horizontal cross-seam stepping control 53. An operator control pendant 54 provides control signals on line 55 to analog data acquisition circuitry 51, oscillator control computer 52, and automatic voltage/current control 35.

Circuitry associated with automatic voltage/current control circuit 35 provides to the operator control pendant 54 a signal IN RANGE LED which illuminates an indicator lamp when the electrode spacing is less than a predetermined amount.

The analog data acquisition circuitry 51 receives a RATE signal, a WIDTH signal, a DWELL RIGHT (RT) signal, and a DWELL LEFT (LT) signal from pendant 54. Oscillator control computer 52 receives an OSCILLATOR (OSC) ON signal, a TRACK ON signal, a vertical STANDOFF ON signal, a CENTERING signal, and an EMERGENCY (E) STOP signal from pendant 54, and transmits status signals CORRECTION RIGHT (CORR RT) and CORRECTION LEFT (CORR LT) to the pendant. The operator control pendant also provides a VERTICAL DISTANCE REFERENCE (REF) signal and a JOG IN/OUT signal to automatic voltage/current control circuit 35.

Oscillator control computer 52 performs the tasks required to control the horizontal movement of electrode 12. After receiving basic parameters from pendant 54 through analog data acquisition circuitry 51 on lines 56, oscillator control computer 52 provides control signals on lines 57 to horizontal cross-seam stepping control 53. The stepping control 53 controls a stepping motor 60 which moves or oscillates electrode 12 within the weld groove by moving cross-seam slide 21.

A signal processing computer 61 receives the arc signal on line 34 from vertical position control circuit 30 and performs additional noise elimination by digital filtering. The various signal processing techniques employed to accomplish this noise removal are discussed in detail below. The information which is obtained from the arc signal, after processing by computer 61, allows determination of the position of the electrode vis a vis the workpiece. Thus, signal processing computer 61 is able to provide in a feedback manner electrode position information to oscillator control computer 52 so that the center line of oscillation of electrode 12 is maintained in the center of the weld groove.

Data characteristic of the electrode-to-workpiece spacing is provided on tracking data bus 62, which comprises eight bits of digital information, to oscillator control computer 52. Signal processing computer 61 receives a TRACK signal, a DWELL LEFT signal, and a DWELL RIGHT signal from oscillator control computer 52, on lines 63.

A primary object of the present invention is to insure high quality welds by maintaining a proper electrode-to-workpiece spacing as the electrode is moved along the longitudinal path of the weld joint. A representative cross-sectional view of such a weld joint is shown in FIGS. 2a-2d in various lateral positions of the electrode with respect to the workpiece. Electrode 12 oscillates about a nominal center reference point or center line of oscillation 16 from the extreme left position indicated at 12 to the extreme right position indicated at 12', assuming a fixed width of oscillation to either side of the centerline 16. When the electrode is at the position indicated at 12, the vertical distance between the tip of the electrode and the sidewall of the workpiece is distance $Y_1$. When the electrode is at the position indicated at 12', the vertical distance between the tip of the electrode and the sidewall of the workpiece is $Y_2$. If, as shown in FIG. 2a, the weld joint profile is uniform, the electrode oscillates equal distances to either side of center line 16 and $Y_1$ should equal $Y_2$ at the extremes of oscillation distance. In this situation, no center line correction is required as the center line of oscillation is moved along the path of the weld joint.

In FIG. 2b, it may be observed that vertical distance $Y_1$, when the electrode is in the position indicated at 12, is greater than vertical distance $Y_2$, at the other extreme of oscillation of the electrode, still assuming a fixed oscillation width. Thus, the center of oscillation 16 requires correction towards the left of FIG. 2b in order to assure that on subsequent oscillations distance $Y_2$ will be equal to distance $Y_1$. In FIG. 2c, the center line of oscillation needs correction towards the right of FIG. 2c because distance $Y_2$ is greater than distance $Y_1$.

FIG. 2d, when compared to FIG. 2a, demonstrates the situation wherein at a time $t=t_1$ subsequent to time $t=t_0$ the width of oscillation requires an increase in order to provide acceptable quality welds. Assuming that, at time $t=t_1$, when the electrode has moved further down the longitudinal path of the weld, the weld profile has increased in width, oscillation about the center line 16 to the same lateral extremes as indicated in FIG. 2a results in the failure of the tip of the electrode to approach closely enough to the sidewall of the joint for a good weld. Although vertical distance $Y_1$ equals vertical distance $Y_2$, the width of oscillation should be increased so as to move the tip of the electrode closer to the sidewalls. Thus, FIG. 2d shows that the width of oscillation should be increased from that shown in FIG. 2a. Additionally, for welding processes wherein metal wire is fed into the joint, the wire feed rate also must be increased so as to provide uniform fill. The travel speed of the electrode along the seam may also need to be decreased to allow for uniform fill.

In order to provide a basis for comparisons such as those indicated in FIG. 2, it has been found desirable to accumulate more data representative of the weld joint profile than typically accumulated by prior art systems. By taking data across the entire weld joint as opposed to only at the extremes of oscillation, the present invention is able to detect changes in the shape and width of the weld profile as well as changes in the direction of the longitudinal path of the weld joint, and generate correction signals to compensate for the changes.

At least two techniques for accumulating data representative of the weld joint profile are suitable for use in the present invention, although other techniques may occur to those skilled in the art. Since either the arc voltage or arc current varies with the distance between the tip of the electrode and the workpiece for all forms of arc welding, a joint profile can be obtained by holding the electrode vertically stationary as the electrode is oscillated across the seam and measuring the fluctuations in the arc voltage or current signal during the movement. This technique is demonstrated in FIGS. 3a–3c. In FIG. 3b, "y" represents the vertical spacing between the tip of the electrode 12 and the workpiece 14, as seen in FIG. 3a, as the electrode is moved across the seam in the "x" direction towards 12'. FIG. 3c represents a signal S(x,y) which varies as a function of x and y. It will be appreciated that the signal S(x,y) may represent either voltage or current depending upon the particular welding process employed.

FIGS. 4a–4b illustrate an alternative technique for measuring the joint profile. As the electrode 12 is moved laterally in the x direction towards the position indicated at 12', the vertical spacing "z" between the tip of the electrode 12 and the workpiece 14 is maintained at a constant value. This may be accomplished by use of an automatic voltage control or automatic current control vertical servo mechanism which is capable of sensing changes in the voltage or current, and changing the vertical spacing in order to hold the voltage or current at a fixed constant value.

As shown in FIG. 4a, if the vertical spacing is maintained at a constant value z, the vertical dimension y relative to the initial starting position when the electrode is at the position indicated at 12 necessarily decreases and increases as the electrode is moved laterally in the x direction. The changes in y may be detected by mechanically coupling a precision potentiometer to the electrode 12 and measuring the changes in resistance which occur as the electrode is maintained at the constant distance above the surface of the workpiece. The signal S(x,y) shown in FIG. 4b is representative of the changes in y which would be anticipated.

A third technique for obtaining the joint profile is to permit the automatic voltage/current vertical control to be active during a middle portion of the excursion where the profile is not expected to change drastically, and to deactivate the control a predetermined distance from the last known sidewall. Profile data will be available essentially as in the first technique, except that the most useful information will be derived from the portion of the excursion nearer the sidewalls. This latter technique is advantageous in that it allows the vertical control to operate in areas where the likelihood of useful data is minimal.

Turning now to FIG. 5, a more detailed schematic diagram of the circuits comprising the vertical position control circuitry 30, shown in FIG. 1, may be seen. As discussed in connection with FIG. 1, the circuitry of the vertical position control receives the signal representative of the welding arc voltage or current, depending upon the welding process involved, and utilizes the signal to control the vertical spacing of the electrode above the workpiece. The arc voltage or current signal, which is carried in cable 25 between the welding power supply and the electrode, is detected by arc current-/voltage detector 31. The signal from the arc current-/voltage detector is provided on line 32 to an amplifier 65, which in the preferred embodiment comprises a conventional gain-adjustable operational amplifier well-known to those skilled in the art. Potentiometer 66, connected in a feedback manner to amplifier 65, allows adjustment of the gain in the known manner.

The signal from amplifier 65 may be then provided on line 67 to low-pass filter 33, if desired. Filter 33 comprises in the preferred embodiment a conventional third order Butterworth low-pass active filter having a cutoff frequency of about 3 Hz for GMAW and about 36 Hz for GTAW. The frequency of cutoff should be chosen so as to insure that the signal provided on the output of the filter removes undesirable noise signals which would mask the voltage level of the arc signal which is proportional to the electrode spacing. If a low pass filter is employed, the cutoff frequency should be sufficiently high to insure that the response time of the filter is not so slow so as to impair the oscillation frequency of the electrode. For short arc GMAW having shorting frequencies as low as 25 Hz, a cutoff frequency of 3 Hz has been found satisfactory. Other active filter circuits having different orders, cutoff frequencies, and propagation delays may be employed in the present invention, depending upon the considerations deemed most significant.

The output of filter 33 is provided on line 34 as the ARC SIGNAL to FIG. 7 and to automatic voltage/current control 35. The ARC SIGNAL has a magnitude which varies proportionally to the electrode-to-workpiece spacing, except that transient noise signals which are difficult to remove by analog filter means may still be present. Signal processing circuitry, as discussed below, removes these undesirable noise components.

An operator of the adaptive tracking system of the present invention enters commands and initial parameters to the system through operator control pendant 54, also shown in FIG. 5. The control pendant houses several control switches and knobs which perform several different functions. A switch labeled "OSCILLATOR ON/OFF" 71 generates a signal OSCILLATOR ON, which is a command to the system to begin oscillation of the electrode within the weld groove. A knob 72 labeled "CENTERING" turns a conventional optical encoder mounted in the pendant which generates two pulsed signals, CENTERING A and CENTERING B. The operator visually inspects the oscillation of the electrode within the weld groove and adjusts the CENTERING knob until the oscillation of the electrode appears centered. Centering may be adjusted in a test groove, or in the actual weld groove immediately prior to welding.

A knob 73, entitled "RATE", generates a signal RATE which controls the rate at which the electrode oscillates within the weld groove. A knob 74 entitled "WIDTH" generates a signal WIDTH which controls the width of oscillation of the electrode about the center. These parameters are also set in a test groove or in the actual groove prior to welding.

The pendant 54 also includes two knobs which preset the amount of time that the electrode dwells at the sidewalls of the weld groove prior to returning toward the center of oscillation. Different controls are required for the left sidewall and the right sidewall because of the possibility that one sidewall possesses different metallurgical characteristics which require additional dwell time for a high-quality weld. A knob 75 labeled "DWELL-LT" generates a signal DWELL LEFT which controls the amount of dwell time on the left sidewall, while a knob 76 labeled "DWELL-RT" generates a signal DWELL RIGHT which controls the dwell time on the right sidewall.

The automatic adaptive tracking feature of the present invention is controlled by a switch 80 labeled "AUTOTRACK". A signal TRACK ON is generated in response to actuation of switch 80 and commands the system to begin tracking within the weld groove. A pair of light-emitting diodes 81, 82, which are labeled "CORRECTION LEFT" and "CORRECTION RIGHT", respectively, provide visual indications to the operator that tracking correction is underway. Signals entitled "CORR LT LED" and "CORR RT LED" are received from other portions of the circuitry and illuminate or extinguish indicators 81 and 82, depending upon whether centering correction is being implemented in the left direction or in the right direction.

The operator control pendant 54 further contains switches and indicators for setting and monitoring the vertical spacing of the electrode above the workpiece. A switch 83 labeled "STANDOFF ON/OFF" generates a signal STANDOFF ON which is a command to the system to turn on the vertical control capability of the present invention. Knob 84 labeled "DISTANCE" generates a signal VERTICAL DISTANCE REF which is used by automatic voltage/current control 35 shown in FIG. 5 as a reference by which the vertical spacing of the electrode tip above the workpiece is measured. Prior to initiating the automatic tracking capability, the operator adjusts the vertical spacing with the "DISTANCE" knob in order to provide a good weld.

Switch 85, labeled "JOG OUT/IN", a double pole single throw momentary switch, generates signals JOG IN and JOG OUT which provide gross adjustments to the vertical spacing of the electrode. When the electrode tip is sufficiently close to the workpiece so that the automatic voltage/current control circuitry 35 can become operative, signal IN RANGE LED is provided from the circuitry in FIG. 5 to indicator 86 labeled "IN RANGE". Finally, should the operator desire to immediately cease welding and tracking because of an emergency, switch 87 labeled "E-STOP", which generates signal E STOP, may be actuated to provide a command for an emergency stop.

Turning now to the automatic voltage/current control circuitry 35 shown in FIG. 5, the VERTICAL DISTANCE REF signal from the operator pendant is provided to buffer amplifier 90. Amplifier 90 conditions the VERTICAL DISTANCE REF signal before it is provided to calibration amplifier 91. The level of the VERTICAL DISTANCE REF signal may be adjusted by conventional feedback potentiometer 92.

The output of calibration amplifier 91 is provided on line 96 to one input of a comparator 97. The other input to comparator 97 is received on line 67 from the output of amplifier 65. When the signals received on lines 96 and 97 are equal, comparator 97 outputs the signal IN RANGE LED, on line 98, which illuminates indicator 87 labelled "IN RANGE" on the operator control pendant. There is thus provided a visual indication to the operator that the electrode is within operable proximity to the weld joint.

When the operator of the system has actuated the "STAND OFF" switch 83 on the operator control pendant, a command is provided to the system to initiate the automatic voltage/current control circuitry. The signal STANDOFF ON is provided from switch 83 to the circuitry in FIG. 6. In response to the actuation of the switch, the circuitry in FIG. 6 provides a signal RELAY ON which is provided on line 93 in FIG. 5 to the coil 94 of relay 95. The actuation of relay 95 closes several sets of contacts which permit the summing of various signals to provide a composite signal representative of the desired position of the electrode above the workpiece. This composite signal then is used to control the electrode vertical spacing.

The actuation of relay 95 closes normally-open contacts 100 and opens normally-closed contacts 101, thereby permitting the ARC SIGNAL to be provided through summing resistor 102 to a summing node 103. The composite signal mentioned above appears at summing node 103.

Normally-open relay contacts 104, attached to line 96, are closed and normally-closed contacts 105 are opened upon the actuation of relay 95, thereby permitting the VERTICAL DISTANCE REF signal to be provided through summing resistor 106 to summing node 103.

Finally, the actuation of relay 95 closes normally-open contacts 110 and opens normally-closed contacts 112, thereby permitting the signal from tachometer 41 received on line 42 to be admitted to amplifier 113 and through summing resistor 114 to summing node 103. The signal from tachometer 41 is adjusted for speed via a potentiometer 115 and for position via a potentiometer 116 in the conventional manner. Amplifier 113 in the preferred embodiment is a conventional operational amplifier which provides an output signal proportional to its input signal.

The composite signal appearing at summing node 103 is proportional to the desired spacing of the electrode above the workpiece as a function of the arc current or voltage detected by detector 31, the operator-set VERTICAL DISTANCE REF signal, and information characteristic of the speed and direction of movement of the electrode as provided by tachometer 41. The composite signal is provided on line 120 to the input of vertical servo control 36. In the preferred embodiment, vertical servo control 36 is a power operational amplifier having a bipolar class B output stage such as the model PA-223 manufactured by Torque Systems, Inc. of Waltham, Mass. The output of this amplifier may be coupled directly to vertical servomotor 40 in the manner well-known to those skilled in the art. Other servomotor amplifier systems may successfully be employed in the present invention with comparable results.

In some modes of operation, it is desirable to disable the vertical servomotor at certain portions of the electrode cross-seam traverse. For example, it has also been found that quality welds may be made if the automatic voltage/current control 35 is operative only for every other cross-seam traverse. Vertical servo control 36 may be enabled or disabled by signal SERVO ENABLE provided on line 121 from FIG. 6 to the input of a buffer amplifier 122. The output of amplifier 122 provides a 15 volt signal on line 125 to the "INHIBIT" input pin 123 of vertical servo control 36 to enable or disable the servo.

Still referring to FIG. 5, gross adjustments in the spacing of the electrode above the workpiece are controlled by the operator from the JOG OUT/IN switch 85 on operator control pendant 54. The JOG IN signal actuates a relay 130 which closes contacts 131, thereby connecting a positive power supply through speed adjustment potentiometer 132 to summing node 103. In a similar fashion, the JOG OUT signal actuates relay 133 which closes contacts 134, thereby connecting a negative power supply through speed adjustment potentiometer 135 to summing node 103. Potentiometers 132 and 135 may be adjusted to control the speed at which the electrode approaches the groove when gross adjustments are made by the operator. It will now be appreciated that FIG. 5 illustrates means for automatically or selectively controlling the vertical spacing of the electrode from the workpiece and for providing an operator interface to the adaptive control system of the present invention.

FIG. 6 illustrates in detail the circuit components of horizontal control circuitry 50, shown generally in FIG. 1. The three major circuit components of the horizontal control circuitry include analog data acquisition circuitry 51, oscillator control computer circuitry 52 and horizontal cross-seam stepping control 53, which together perform the functions required to control the oscillation of the electrode within the weld joint.

Various analog signals from the operator control pendant 54 are provided to analog data acquisition circuit 51. The RATE, WIDTH, DWELL LEFT, and DWELL RIGHT signals are conditioned and amplified by buffer amplifiers 140–143 prior to being provided to data acquisition circuit 144. In the preferred embodiment, the functions of data acquisition circuit 144 are provided by a microprocessor-compatible 8-bit, 8 channel memory buffered complementary MOS data-acquisition system such as the model AD7581 manufactured by Analog Devices Corporation of Norwood, Mass. Those skilled in the art will appreciate that data acquisition circuit 144 is capable of receiving analog data signals on its inputs and providing, in response to commands, digital signals characteristic of those analog signals. Data acquisition circuit 144 includes an 8-bit analog-to-digital converter, and 8 channel multiplexer, memory, and data drivers which are compatible with most microcomputer circuits. Address signals, data signals, and control signals are provided on lines 56 from oscillator control computer circuitry 52, as will be described next.

Also illustrated in FIG. 6 is oscillator control computer 52. The central controller of oscillator control computer 52 is an 8-bit microprocessor 150. In the preferred embodiment, microprocessor 150 is a model MC6800 manufactured by Motorola, Inc. of Phoenix, Ariz. As will be appreciated by those skilled in the art, microprocessor 150 communicates with peripheral devices via 8-bit data bus one—151 (which performs all data transfers between the microcomputer and the various devices which microcomputer 150 serves), address bus one 152, (which provides addresses to the various devices with which the microcomputer communicates), and control bus one 153. Control bus one 153 includes various timing and control signals associated with the microcomputer such as interrupt request (IRQ), read/write (R/W) commands, reset, and clock (CK) signals.

Control bus one 153 and address bus one 152 are provided to control and chip select (CS) decoding circuitry 154. As will be understood by those skilled in the art, control and chip select circuitry 154 is responsible for decoding addresses and control signals received from microprocessor 150 and providing appropriate control signals to a particular selected peripheral circuit upon command. Thus, it will be understood that timing and control signals for determining which peripheral circuit shall have access to the data bus one 151 are provided under program control of microprocessor 150. It will be further understood that each peripheral circuit which communicates with microprocessor 150 via the various buses each receives address signals on address bus one 152, control signals on control bus one 153, and sends and receives data via data bus one 151.

One of the peripheral devices with which microprocessor 150 communicates is peripheral interface adapter (PIA) 160. In the preferred embodiment, PIA 160 is the model MC6821P peripheral interface adapter manufactured by Motorola, Inc. of Phoenix, Ariz. All PIAs used in the preferred embodiment are identical and include a pair of bidirectional data ports, PORT A and PORT B, each capable of sending and receiving 8 bits of digital data. The PIA selectably directs data from or to data bus one 151, to or from PORT A or PORT B, under program control upon receipt of appropriate address and command signals over address bus one 152 and control bus one 153, respectively.

PORT A of PIA 160 is connected to a plurality of switches 161 which are used to manually set the maximum amount of cross-seam correction allowable. Those skilled in the art will appreciate that switches 161 may comprise conventional dual-in-line single pole single throw switches connected to conventional pull up resistors in a fashion so that an 8-bit digital word corresponding to the maximum cross-seam correction is read by microprocessor 150 under program control.

As discussed above in connection with FIG. 5, the CENTERING knob 72 provides a pair of signals, CENTERING A and CENTERING B, to the circuitry shown in FIG. 6. The CENTERING A signal triggers a one-shot monostable multivibrator 162, which in the preferred embodiment is a model 74121 manufactured by Texas Instruments, Inc., of Dallas, Tex. In response to the CENTERING A signal, multivibrator 162 provides a pulse to the clock input of counter 163. The CARRY OUT (CO) output of counter 163 is tied to the clock (CK) input of counter 164. Counters 163 and 164 in the preferred embodiment are Texas Instruments, Inc. Model SN74LS191 4 bit binary up/down counters. The CENTERING B signal is connected to the up/down (UP/DN) input of both counters. The outputs of counters 163 and 164, a total of 8 bits, are provided to PORT A of another PIA 165, which thereby allows microprocessor 150 to read the contents of the counters under program control.

Those skilled in the art will recognize and appreciate that the configuration of counters 163 and 164 together with multivibrator 162 provides a technique for converting the rotation of the shaft of the optical encoder on the operator control pendant into an 8-bit binary number representative of the position of the knob. The microprocessor uses these bits of digital information to adjust the centering of oscillation of the torch.

Two bits of PORT B of PIA 165 are connected to a RIGHT LIMIT switch 170 and a LEFT LIMIT switch 171, which are pulled up via resistors in the conventional manner and switch to ground upon actuation. Limit switches 170 and 171 are physically mounted to the horizontal cross-seam slide 21 and are actuated when the cross-seam slide reaches the maximum extent of its allowed movement.

A counter 172 configured as a conventional frequency divider provides on line 173 a divided-down signal proportional to the input frequency that is provided to the clock (CK) input of the counter. In the preferred embodiment, the clock frequency for the microprocessor-controlled peripherals in one megahertz, and the signal on line 173 has been divided to 250 kilohertz.

The 250 kilohertz signal on line 173 is provided to the clock (CK) input of bit rate multiplier 174, in the preferred embodiment a model SN7497 manufactured by Texas Instruments, Inc. The rate of multiplication of the input frequency is received on the six lines 175 from PORT B of PIA 165. The output (OUT) of multiplier 174 is provided on line 176. Those skilled in the art will appreciate that microprocessor 150 controls the frequency of the signal on line 176 to a resolution of 6 bits through data provided on lines 175. The output of multiplier 174 is used to provide acceleration and deceleration timing signals for the horizontal cross-seam stepping control, discussed below.

A programmable timer 180 receives the multiplied signal on line 176 at one of the clock inputs C1. Programmable timer 180 in the preferred embodiment is a model 6840 manufactured by Motorola, Inc., and the operation of the timer will be known to those skilled in the art. The first output (O1) of timer 180 is provided to the second clock input (C2) and also constitutes a STEP signal which is provided on line 181. The STEP signal is used as a command to the cross-seam stepping control 53 to step the stepping motor one step. Those skilled in the art will appreciate that programmable timer 180, being connected via the address, data, and control buses to microprocessor 150, allows the microprocessor to control the duration and frequency of the steps provided to the stepping control so that acceleration, travel, and deceleration periods may be provided for the stepping motor.

Another input to the horizontal cross-seam stepping control 53 is received on line 182 from a control bit output (CB2) from PIA 165. This signal, entitled STEP RIGHT/LEFT, is a direction command to the stepping control. Horizontal cross-seam stepping control 53 in the preferred embodiment is a model 29A125 5 amp chopper drive manufactured by Sigma Instruments, Inc., of Braintree, Mass. The output of the stepping control 53 drives stepping motor 60 in the manner which will be known to those skilled in the art. Thus, it will be appreciated that microprocessor 150 controls the lateral oscillation of the electrode by providing appropriate control pulses to horizontal cross-seam stepping control 53 when movement of the electrode is desired.

A third PIA 185 provides the interface between microprocessor 150 and the operator pendant 54 by receiving and transmitting signals. Those skilled in the art will appreciate that PIA 185 receives commands from the pendant and transmit indicator signals thereto under program control of microprocessor 150.

A fourth PIA 190 interfaces microprocessor 150, and thus oscillator control computer 52, with signal processing computer 61 (shown in FIG. 1). PORT A of PIA 190 receives on tracking data bus 62 eight bits which represent the electrode position information which has been processed to remove undesirable noise. PORT B of PIA 190 provides a TRACK signal, the DWELL LEFT signal, and the DWELL RIGHT signal to signal processing computer 61. Additionally, PIA 190 provides the signal SERVO ENABLE on line 121, which is provided to automatic voltage/current control circuit 35, shown in FIG. 5.

Other components of oscillator control computer 52 include read only memory (ROM) 191, which stores the program for microprocessor 150, and random access memory (RAM) 192, which is used for interim data storage by microprocessor 150. Those skilled in the art will appreciate that ROM 191 and RAM 192 are connected to address bus one 152, data bus one 151, and control bus one 153 in the conventional manner.

FIG. 7 illustrates in detail the circuitry comprising signal processing computer 61 shown generally in FIG. 1. As stated above, signal processing computer 61 includes a second microprocessor which allows rapid and efficient processing of the electrode position information derived from the arc current/voltage detector 31. In the preferred embodiment of the signal processing computer, a second microprocessor 200 is used to perform signal processing functions. It will, however, be appreciated that a single computing means having a sufficiently short cycle time could handle the processing performed by microprocessors 150 and 200. Some of the anticipated new microprocessor chips may be expected to replace the two microprocessors required to construct the preferred embodiment at present.

Microprocessor 200 is also a model MC6800 manufactured by Motorola, Inc. ROM 201 contains program instructions for microprocessor 200, and RAM 202 is used for interim data storage by microprocessor 200. Microprocessor 200 communicates with various peripheral circuitry including ROM 201 and RAM 202 via data bus two 203, address bus two 204 and control bus two 205, which are similar to the address, data, and control buses for microprocessor 150, except that the buses are separate and communication occurs between microprocessor 200 and microprocessor 150 through TRACKING DATA BUS 62, as will be described below. Address decoding, control, and timing signals for the various peripherals connected to microprocessor 200 are provided by control and chip select (CS) decoding circuit 207, which is essentially the same as circuit 154 for microprocessor 150.

Communication with microprocessor 200 occurs in the same fashion as with microprocessor 150, namely, through peripheral interface adaptors (PIAs) such as those described above. PIA 210 allows communication to an optional robot interface on ROBOT DATA BUS 212. In a system wherein a robot is used to move the cross-seam and vertical slide assemblies along the path, communication may be made between any data-processing functions through ROBOT DATA BUS 212. Specifically, ROBOT DATA BUS 212 carries a signal from the robot to PIA 210 which commands the present invention to "recenter" when the robot has reached the end of the workpiece. Recentering places the electrode to a preset nominal position in anticipation of beginning another weld. Thus, it will be appreciated that the present invention is compatible for operation with devices which perform certain welding tasks and which generate commands to separate machines to perform other tasks.

PORT B of PIA 210 is connected to a pair of separate sets of switches which are used to program the "dead zone" and "sensitivity" of the tracking. Switches 213, a set of four single pole single throw dual inline switches with pullup resistors, provide a 4-bit digital number which represents the "dead zone" desired for the system. The "dead zone" is the amount of horizontal spacing about the center of oscillation which is considered insignificantly small. Switches 214 are a set of four single pole single throw dual inline switches with pullup resistors which are used to program the degree of sensitivity of the horizontal correction according to the welding process variables and joint geometry.

The TRACKING DATA BUS 62, which is provided to FIG. 6, is attached to PORT A of PIA 220. The TRACK signal, the DWELL LEFT signal, and the DWELL RIGHT signal from FIG. 6 are received at PORT B of PIA 220. Also connected to PORT B of PIA 220 are a pair of switches which are used to set the amount of bias of the electrode against a particular sidewall of the weld joint. These switches are actuated if it is desired to force oscillation of the electrode along one particular sidewall or the other of the weld joint. Switch 221 provides a signal that biasing is desired, while switch 222 provides a signal that the left or right sidewall should be favored.

The filtered ARC SIGNAL from FIG. 5 is received at an input IN-B of analog multiplexer 225. A second input IN-A of multiplexer 225 is connected through potentiometer 226 to a negative power supply. Analog multiplexer 225 in the preferred embodiment is a sixteen channel bi-FET analog multiplexer which connects a single output to one of sixteen analog inputs depending upon the state of a 4-bit binary address, such as the model MUX-16 manufactured by Precision Monolithics, Inc. of Santa Clara, Calif. The selection of input IN-A or input IN-B is controlled by a 2-bit address on lines 227, which are connected to the SELECT input of multiplexer 225.

The output (OUT) of multiplexer 225 is provided to the input (IN) of sample and hold circuit 230. Sample and hold circuit 230 in the preferred embodiment is a model SMP-11 precision sample and hold amplifier manufactured by Precision Monolithics, Inc. The output (OUT) of sample and hold circuit 230 is provided to the input (IN) of analog-to-digital converter 231, which in the preferred embodiment is a 12-bit successive approximation analog-to-digital converter such as the model AD ADC80 manufactured by Analog Devices, Inc., of Norwood, Mass. The eight least significant bits of the 12-bit converted word from converter 231 are provided to PORT A of PIA 232, while the four most signficant bits are provided to PORT B of PIA 232.

The busy status output BUSY of converter 231 is connected to a control line (CA1) of PIA 232, and a second control line (CA2) is connected to the start input START of converter 231. A third control signal (CB2) is provided by PIA 232 to the control input (S/H CONTROL) of sample and hold circuit 230. It will be appreciated by those skilled in the art that microcomputer 200 selectively reads the digital equivalent of either the bias control from potentiometer 226 or the ARC SIGNAL through PIA 232.

OPERATION

Figure 8A:
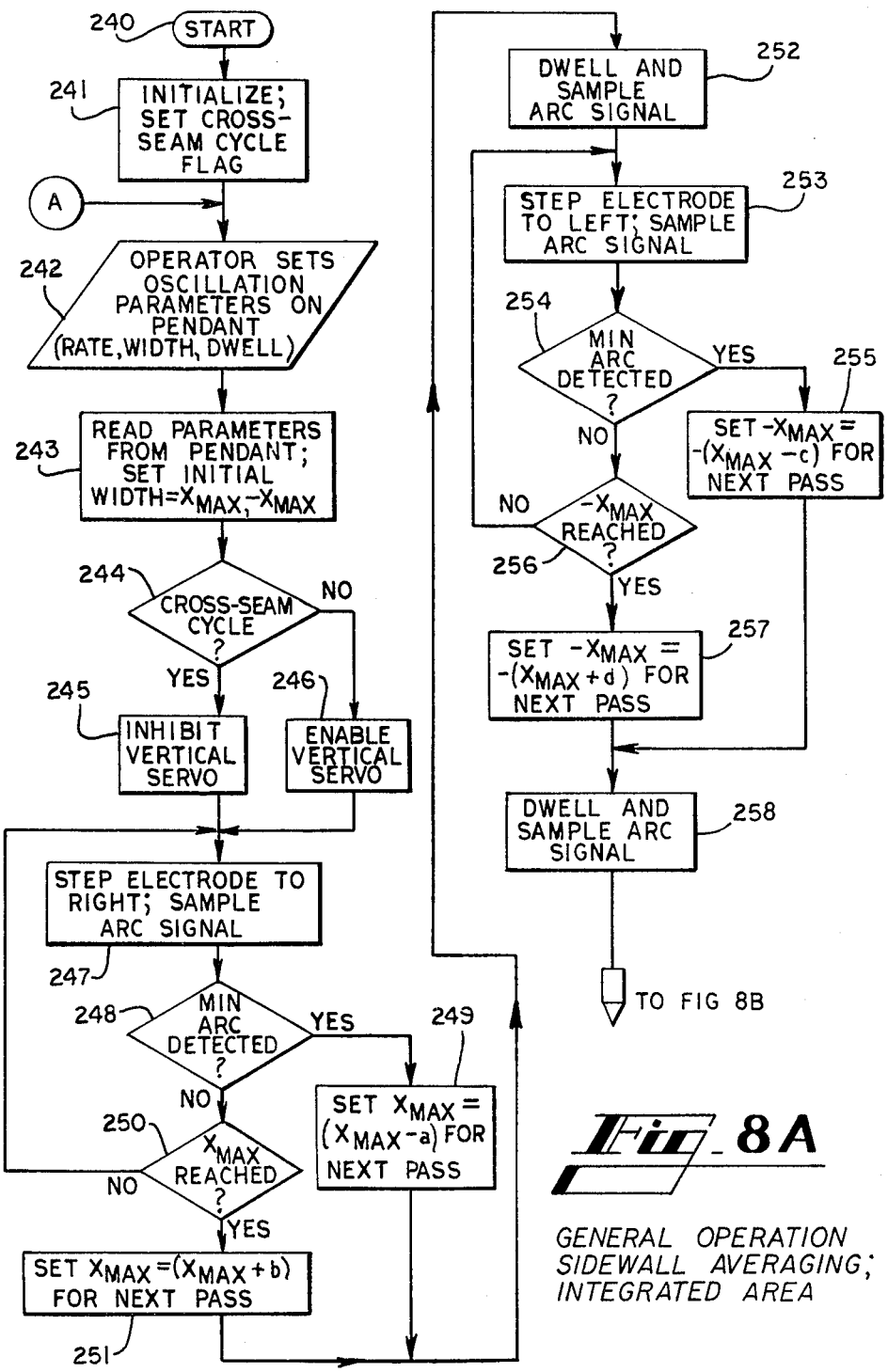
FIGS. 8A-8B are flowchart diagrams of the general operation of the preferred embodiment of the present invention.
Figure 8B:
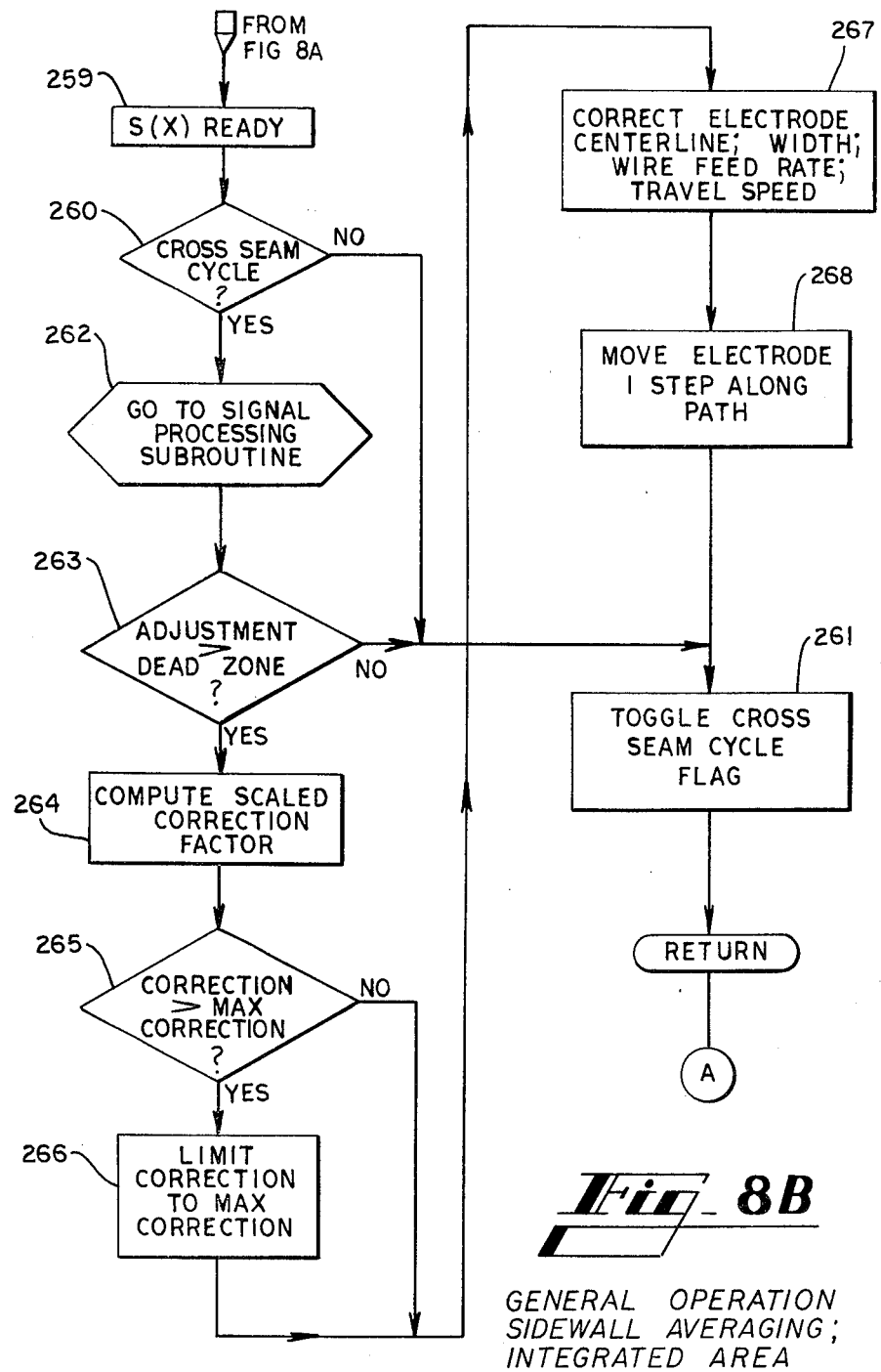
Figure 10A:
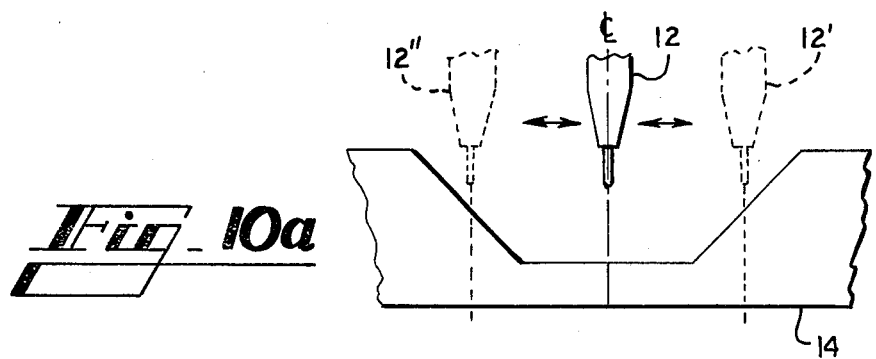
FIGS. 10a-10e show a partial cross-section of a typical weld joint and signals illustrating the integrated area signal processing approach.
Figure 10B:
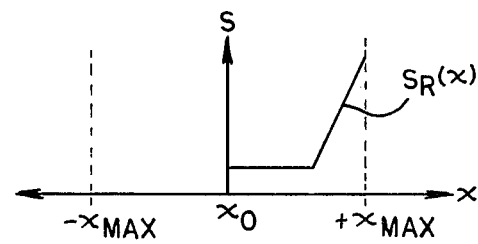
Figure 10C:
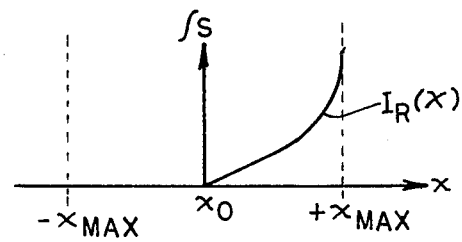
Figure 10D:
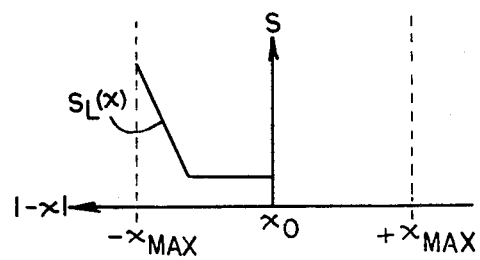
Figure 10E:
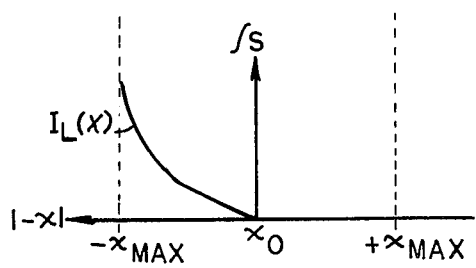

FIGS. 8A–8B are flow diagrams which illustrate the steps that microprocessors 150 and 200 take in the preferred embodiment to accomplish adaptive welding control. It will be understood by those skilled in the art that the flowchart represents a possible series of steps which may be taken to accomplish the objectives of the present invention, and that other sequences of steps may be employed with success in accomplishing control of the welding parameters. Furthermore, it will be understood that the diagram shown in FIGS. 8A–8B may be implemented by means of hard-wired logic circuits in place of microprocessors while still successfully accomplishing the objectives of the invention.

Before discussing the steps shown in FIGS. 8A–8B, it is appropriate to highlight the relationship between vertical position control and data gathering for control of other welding parameters. In the particular sequence illustrated in FIGS. 8A–8B, alternating oscillations of the electrode are used for data acquisition and tracking control, with the vertical servomechanism disabled so that the electrode cannot move vertically. Thus, the system is assured of obtaining accurate data during the oscillation free from errors attributable to vertical movement. Such an oscillation is referred to as a "cross seam cycle", meaning that data corresponding to the joint profile is to be taken as the electrode crosses the weld seam. Upon the immediately succeeding oscillation, the vertical servomechanism is enabled for what may be called a "vertical correction cycle". In the vertical correction cycle, a good weld is obtained on the sidewalls because of the operation of the vertical servomechanism. The center line of oscillation is also corrected based upon the data taken during the cross-seam cycle. The oscillation which follows the vertical correction cycle, which is another cross-seam cycle, will have a new, corrected center of oscillation.

Thus, it will be understood that in FIGS. 8A–8B cross-seam cycles are interleaved or time-multiplexed with cycles wherein the vertical servomechanism is enabled and operative. As shown in FIGS. 8A–8B, the preferred embodiment has every other oscillation a cross-seam cycle. Other multiplexing may, however, be desirable in certain applications. For example, in a seam known to have a gradually changing path, it may be desirable to have a predetermined number, say five, vertical correction cycles and then a cross-seam cycle. Alternatively, it may be desirable in certain other applications to have a predetermined number of cross-seam cycles and then a vertical correction cycle. In still other applications it may be desirable to completely disable the vertical servomechanism and have every oscillation a cross-seam cycle, as where acceptable sidewall tie-in is obtained without assistance from the vertical position control. It will therefore be appreciated that various combinations of interleaving and multiplexing of cross-seam cycles with vertical control cycles are contemplated by the present invention.

It also should be understood that other techniques for multiplexing vertical control with data gathering for adaptive control, not illustrated in the flow chart, will provide acceptable results. For example, the vertical servo control may be enabled as the electrode passes the centerline until the electrode reaches a predetermined distance from the last known position of the sidewall. Then, the vertical servo control could be disabled as data is gathered and processed on the approach to the sidewall. When the electrode has approached the sidewall within a predetermined vertical limit, the oscillation can be reversed, and the vertical servomotor re-enabled a predetermined distance from this newly detected sidewall.

Starting at 240 in FIG. 8A, the microprocessor performs an initializing routine at 241, well known to those skilled in the art, which resets and initializes switches and registers within the microprocessors. A flag for keeping track of cross-seam cycles is also initially set. At 242, the operator sets the desired oscillation parameters at such as rate, width, and dwell times at the operator control pendant.

At 243, microprocessor 150 reads the oscillation parameters from the operator control pendant and stores these values for future reference. This step includes setting the initial width of oscillation, $x_{MAX}$ and $-x_{MAX}$, and allows determination of the number of steps of the cross-seam stepping motor 60 required to reach these initial extremes.

At decision block 244, if the present oscillation is a "cross-seam" cycle, the vertical servomechanism will be inhibited at 245 so that accurate data may be obtained.

If a cross-seam cycle is not expected for the current oscillation, the vertical servomechanism will be enabled at 246, in which case the automatic voltage/current control circuitry described in connection with FIG. 5 is free to adjust the vertical spacing of the electrode above the workpiece in accordance with the arc signal, the vertical distance reference, and the tachometer signal.

After the determination has been made as to whether the vertical servomechanism is to be operative, the system then commands the horizontal cross-seam stepping control 53 (shown in FIG. 6) to step the electrode to the right at 247 and a sample is taken of the arc signal.

At 248, an inquiry is made as to whether the "safety limit" vertical distance to the wall of the joint is made in the block labeled "min arc detected." This represents an inquiry whether the sample just taken reflects that a predetermined minimum arc has been encountered, indicating that the electrode has approached as close to the wall as is considered acceptable. The predetermined minimum arc, manifested as a maximum current value arc signal for GMAW or a minimum voltage value for GTAW, should be programmed into the system prior to welding.

If the minimum arc is detected, at 249 the amount of maximum lateral excursion for the next pass is adjusted by replacing $x_{MAX}$ with $(x_{MAX}-a)$, where "a" is a predetermined nominal adjustment amount. Thus, on the next succeeding oscillation, the electrode will not tend to approach as close to the sidewall as during the oscillation just completed. It will be appreciated that the foregoing step allows adaptation to a narrowing profile.

If the minimum arc is not detected, however, at 250 there is an inquiry whether the electrode has reached the maximum excursion $x_{MAX}$. If $x_{MAX}$ has not been reached, the flow returns to block 247 and the rightward movement of the electrode is continued by stepping the electrode. If on the other hand the electrode makes it to $x_{MAX}$ without encountering the minimum arc, at 251 the amount of maximum lateral excursion for the next pass is adjusted by replacing $x_{MAX}$ with $(x_{MAX}+b)$, where "b" is a predetermined nominal adjustment amount. On the next succeeding oscillation the electrode will tend to move further laterally beyond the maximum excursion allowed during the oscillation just completed. It will now be appreciated that the foregoing steps allow adaptation to a widening profile.

It should be noted here that if biasing is desired, the value of $x_{MAX}$ is adjusted to force the electrode closer or further away from a particular sidewall.

At 252, when the maximum excursion has been reached through either of the inquiries in blocks 248 or 250, the electrode will dwell the amount of time as determined by the DWELL RIGHT signal and a predetermined number of data samples are taken.

After dwelling, the electrode is stepped in the opposite, leftward direction and a sample of the arc signal is taken at 253. At 254, a minimum arc inquiry similar to the one in block 248 is taken, and if detected, the leftward maximum excursion $-x_{MAX}$ is replaced at 255 by $-(x_{MAX}-c)$ for the next pass, "c" being a predetermined nominal distance. If the minimum arc is not detected, at 256 there is an inquiry whether $-x_{MAX}$ has been reached. If not, block 253 is returned to and another step is taken. If $-x_{MAX}$ has been reached, $-x_{MAX}$ is replaced with $-(x_{MAX}+d)$, where "d" is a nominal adjustment, so that a wider excursion is allowed for the next pass, at 257. At 258, the electrode dwells in accordance with the DWELL LEFT signal and a predetermined number of samples are taken.

At 259, the signal S(x) corresponding to the joint profile is now ready to be processed, since data corresponding to the entire lateral profile of the joint has been accumulated.

At decision block 260, the inquiry is again made whether the present oscillation cycle is a cross-seam cycle. If not, the cross-seam cycle flag is toggled at 261 and the flow of the process returns to point A in FIG. 8A. If the present cycle is a cross-seam cycle, a signal processing subroutine is entered at block 262. In this subroutine, data corresponding to the signal S(x) is used as the basis of computations for adjusting the various welding parameters.

A comparison is made at 263 between the welding parameter adjustments and the amount of dead zone which has been programmed into the system. For example, one of the welding parameters commonly adjusted is the tracking error, or location of the center of oscillation relative to the center of the weld seam. Continuing with the example, at 264, if the amount of adjustment to the tracking is greater than the dead zone, a correction factor which has been scaled according to a constant scale factor is computed. At 265, a comparison is made between the scaled correction factor and the value of the maximum correction which has been preprogrammed. In the event that the correction desired is in excess of the maximum correction allowable, at 266, the scaled correction factor will be limited to the maximum correction allowable. Then, at 267, the center line of oscillation is corrected by adding or subtracting the scaled correction factor to the location of the present oscillation center. Thus, on subsequent oscillations of the electrode, the electrode will move about an altered center line.

Those skilled in the art will appreciate that other welding parameters, such as width of oscillation, wire feed rate, travel speed, and the like may at this point be similarly adjusted. After adjustment of the desired parameters, the electrode is moved one step longitudinally along the weld seam path at 268, the cross-seam cycle flag is toggled at 261, and a return is made to point A and the process beings anew.

It will now be seen that the electrode traces a zig-zag path as the electrode oscillates laterally and is moved longitudinally along the path of the joint. In actuality, this path is three-dimensional due to the operation of the vertical servomechanism. However, to accurately describe the interleaving or multiplexing interaction between the vertical position control and data gathering for control of other parameters described earlier, a horizontal path of travel may be defined for a plurality of oscillations by projecting the lateral and longitudinal movement of the electrode onto a plane which is perpendicular to the axis of the electrode. It is in this plane that the electrode traces the zig-zag path.

It will now be understood that the vertical position control may be described as being selectively operable for predetermined portions of the projected path of travel. In the steps shown in FIGS. 8A–8B, the vertical position control is disabled during those portions of the path which are designated a cross-seam cycle and enabled during those portions of the path corresponding to a vertical correction cycle. It will also be understood, however, that the predetermined portions of the path in which the vertical position control is operable may be made larger or smaller, depending on the particular application. For example, the portion of the path in which vertical position control is operable may correspond to a single electrode oscillation for a plurality of cross-seam cycles. Conversely, the portion of the path in which vertical position control is operable may correspond to a plurality of oscillations for one cross seam cycle. Alternatively, the portion of the path may also correspond to a portion of a single oscillation, as where data is taken near the extremes of oscillations and vertical position control is operable during the central portions of the oscillations. Finally, it will be understood that simultaneous operation of vertical position control and data gathering is theoretically possible if the data samples taken are adjusted according to a factor related to the movement induced by the vertical position control.

I. SIGNAL PROCESSING BY SIDEWALL AVERAGING APPROACH

FIG. 9 demonstrates one technique for processing the arc signal samples so as to provide for correction of the center line of oscillation. Referring to FIG. 9, FIG. 9a shows a welding electrode 12 as it oscillates to the right to the position indicated at 12' and to the left to the position indicated at 12''. The center line of oscillation is indicated at $x_0$. FIG. 9b illustrates a signal S(x), either voltage or current, again depending upon the welding process used, which is proportional to the weld joint profile, as a function of the cross-seam coordinate x. The extremes of oscillation are indicated in FIG. 9b as $x_{MAX}$, with the point at which the sidewall begins to slope upwardly from the base of the weld joint indicated at $x_a$.

FIG. 9c represents the signal S(t) as a function of time t, as the electrode moves to the right, dwells, and moves back to x. When the electrode is at $x_a$, the signal slopes upwardly, and as the electrode dwells at the maximum position $x_{MAX}$, the signal S(t) experiences a plateau, and then declines as the electrode is moved left from the position indicated at 12' back toward $x_a$. Data samples of the arc signal, which may here be defined as S(t), may be taken as the electrode traverses the weld groove starting at $x_o$ and then approaches the maximum point, as the electrode dwells, and as the electrode leaves the maximum point of oscillation.

In FIG. 9c, a data window beginning at $x_a$ and closing upon the return to $x_a$ is shown, whereby N samples of the signal S(t) are taken beginning at i=1 to i=N. The location of $x_a$ may be defined as the last known position when the sidewall began to slope up. This technique of using a data window beginning at $x_a$ is useful for applications wherein the vertical position control is operable during the excursion of the electrode across areas of the seam which are not expected to vary widely. In other applications, as where cross-seam cycles are multiplexed with vertical correction cycles, samples may be taken beginning at $x_o$ all the way across the entire seam to and including the dwell area.

A useful technique for removing undesirable noise is to average the signal S(t) over the time that the electrode approaches the sidewall, dwells thereupon, and departs therefrom. Thus, the average of the signal S(t) for the period of oscillation to the right may be represented by the following equation:

$$S_{AVG\ RIGHT} = \frac{\sum_{i=0}^{N} S(t_i)}{N} \qquad \text{EQUATION 1}$$

A similar average $S_{AVG\ LEFT}$ may be computed for the oscillation of the electrode to the left from the position indicated at 12 to that indicated at 12''. Once the two averages have been computed, the adjustment or correction of the center line may be computed according to the following equation:

$$\mathcal{L}\ CORRECTION = x_0 + k[S_{AVG\ LEFT} - S_{AVG\ RIGHT}] \qquad \text{Equation 2}$$

where k is a constant scale factor which is used to proportionally adjust the difference between the averages.

Other techniques for utilizing the sidewall averages for noise removal and adaptive control may occur to those skilled in the art. For example, the data for a particular sidewall could be mathematically combined with data from prior excursions toward that sidewall prior to computing the signal average. A weighted average of the data, weighted by a predetermined factor in favor of more recently obtained data, could be employed as the basis of the computed sidewall averages. In essence, the sidewall average in this case is an average of an average.

The general operation discussed above in connection with FIGS. 8A–8B includes a subroutine at block 262 for processing the arc signal samples so as to remove noise and provide a basis for adjusting the welding parameters. At block 262, therefore, the computations according to Equations 1 and 2 are made in the preferred embodiment. Those skilled in the art will understand how to program microprocessor 61 to perform the necessary computations to obtain the adjustment amount for the center of oscillation. Preferably, the difference between $S_{AVG\ LEFT}$ and $S_{AVG\ RIGHT}$ is determined at block 262, compared to the dead zone amount at 263, and scaled according to the constant k at 264. Then, at 267, the electrode centerline of oscillation is corrected by adding the scaled correction factor to the value of the x coordinate representative of the present centerline of oscillation.

It should be noted that parameters related to the width of the seam, such as the width of oscillation, the rate of feed of a consumable electrode, and longitudinal travel speed, are controlled in the preferred embodiment in the following manner. The initial width of oscillation is preset and the amount thereof stored in computer memory. If the width is narrowed for the succeeding oscillation because of min arc detection (FIG. 8A), or is widened because $x_{MAX}$ is reached, appropriate adjustments are made to the stored width amount. Since feed rate, travel speed, etc. are known to be proportional to seam width, the adjusted width amount is used to adjust these width-related parameters in the manner known to those skilled in the art.

It should also be understood that the technique described below in Section III for simultaneous tracking and width correction based upon a reference profile may also be employed for width control in conjunction with the sidewall averaging technique. Time multiplexing or alternating of sidewall averaging with reference signal comparison may be successfully employed to take advantage of the beneficial features of each.

In the preferred embodiment, however, the electrode is allowed to approach within the predetermined distance of the sidewall of the weld joint as represented by the min arc. Without confining the oscillation to fixed predetermined extremes, data corresponding to the profile of the seam is taken for use in determining the profile of the joint for purposes of adjusting the wire feed rate, travel speed, etc. It will therefore be understood that the "safety limits" or predetermined minimum vertical electrode-to-workpiece spacings of the min arc must be preprogrammed so that the electrode does not hit the side wall if the seam narrows.

Additionally, a predetermined maximum vertical spacing may be preprogrammed so that the oscillation may be widened or "opened-up" in the event that the seam widens. In this situation, the electrode would be allowed to oscillate to the predetermined maximum lateral excursion if the predetermined minimum vertical spacing is not impinged. At the lateral extremes, if the vertical spacing detected exceeds the programmed maximum, the electrode may be allowed to reach a greater lateral excursion on the next oscillation, or may alternatively be allowed to move further in the lateral direction during the present oscillation.

II. SIGNAL PROCESSING BY INTEGRATED AREA APPROACH

Another technique for processing the arc signal so as to remove noise may be designated the "integrated area approach", which is illustrated in FIG. 10. As the electrode is oscillated to the right from the position indicated at 12 to that indicated at 12', the signal, shown in FIG. 10b, is $S_R(x)$ as a function of x. If the integral of the signal $S_R(x)$ is computed for the area between $X_0$ and the maximum rightward oscillation $x_{MAX}$, the signal $I_R$ results. This signal may be computed according to the following equation:

$$I_R = \int_{x_0}^{x_{MAX}} S_R(x)dx \qquad \text{EQUATION 3}$$

A similar signal $S_L(x)$ corresponding to the left portion of the joint results when the electrode is oscillated to 12''. The integral $I_L$, illustrated in FIG. 10e, may be computed according to the equation:

$$I_L = \int_{x_0}^{-x_{MAX}} S_L(x)dx \qquad \text{EQUATION 4}$$

Those skilled in the art will appreciate that Equations 3 and 4 may be solved by summed approximations. Analog means known to skilled artisans may also be used to obtain the integrated signals. A correction may be made to the centerline of oscillation according to the following equation:

$$\mathcal{C} \text{ CORRECTION} = x_0 + k[I_R - I_L] \qquad \text{Equation 5}$$

where k represents a constant scale factor. The technique described above may be successfully employed in the present invention by substituting the computations of equations 3, 4, and 5 for equations 1 and 2, as described in connection with FIG. 9.

III. SIGNAL PROCESSING BY INTEGRATED AREA REFERENCE SIGNAL APPROACH

A third signal processing technique which may be designated the "integrated area reference signal approach" follows naturally from the "integrated area" approach. In this signal processing technique, the integrals of the signals $S_R(x)$ and $S_L(x)$ are computed for each data sample taken according to the following equation:

$$I = \int_{x_0}^{x_n} S(x)dx \qquad \text{EQUATION 6}$$

where $x_n$ is the location of the data sample. The integral I for a given data sample associated with a particular side of the weld seam thus represents the integrated arc signal beginning at $x_o$ through the present data sample. Then, the computed integrals of the arc signal are compared to a predetermined value "A" which is representative of the prior history of the weld groove.

The predetermined value A is the integral of a reference signal data set. The reference signal represents a signal comprising a plurality of data which corresponds to the expected arc signal for an idealized expected joint profile. This reference signal may be initially acquired in three manners. First, the reference signal may be obtained analytically based upon the known characteristics of the seam to be welded. In this technique, data corresponding to the idealized seam would be stored directly in computer memory.

Alternatively, the idealized reference signal may be obtained by placing the arc electrode in a test seam which is tracked under close supervision purely for data gathering purposes. An operator sets the initial maximum excursion of the electrode manually at the operator control pendant prior to beginning gathering data. Samples of the arc signal would be repetitively accumulated during the time that it takes the electrode to move across the weld seam up to a desired preset extreme of movement. As the electrode is moved towards the wall of the test groove, data samples would be taken and stored in computer memory, until the electrode is a minimum vertical distance above the wall of the joint consistent with a good weld. When at least one lateral traverse of the electrode has been completed, reference signal data corresponding to the profile of the weld joint will be stored in computer memory.

Alternatively, the reference signal data set may be obtained by taking data during a predetermined number of oscillations at the start of the weld and defining this initial data as the reference signal. A running average based on data from a predetermined number of oscillations of the electrode may then be labeled the "reference signal". This running average may be periodically updated as a first in-first out list as the seam is tracked during welding. Using this technique, the reference signal represents an idealized profile which may gradually change to reflect the changing geometry of the weld joint. This technique especially contrasts with certain prior art devices in which predetermined values such as the width of oscillation are set initially and cannot change automatically or without operator intervention during welding.

Since new data is accumulated on each oscillation of the electrode during welding, it will be appreciated that data gathered on any given oscillation may be combined with data from prior oscillations by use of the running average. The reference signal may then be defined in terms of a running average of data obtained for a predetermined number of oscillations. This data may be updated with data from successive oscillations by adding the data for the present oscillation and dropping out the oldest data. A changing profile may in this fashion be detected and accommodated.

Once the reference signal is established and resident in memory, the predetermined value A is computed by applying Equation 6 to the data of the reference signal, from $x_o$ to $x_n = x_{MAX}$, where $x_{MAX}$ is the extreme lateral position of the reference signal. This is computed once for each cross-seam cycle prior to accumulating a new signal S(x), or once per oscillation when techniques are employed requiring correction on each oscillation.

FIG. 11 illustrates the above-described integrated area reference signal approach to processing the data corresponding to the weld profile. FIG. 11b represents a signal waveform S(x) comprising $S_L(x)$ and $S_R(x)$ as a function of the variable x as the electrode moves from the position at 12 in FIG. 11a where $x = x_o$ to right to 12', and then to the left to 12''. FIG. 11c illustrates an expected integral signal $I_R(x)$ calculated according to Equation 6 based upon $S_R(x)$. It will be understood that an integral signal $I_R(x)$ is computed for each data sample taken as the electrode moves along the x axis toward the nominal extreme of oscillation at $x_{MAX}$. A similar integral $I_L(x)$ is computed for each of the data samples taken on the leftward movement of the torch from $x_o$ to $-x_{MAX}$.

FIG. 11d represents the reference signal R(x) which corresponds to the idealized profile of the joint being welded. As indicated above, the reference signal is analytically or empirically determined prior to the present oscillation.

FIG. 11e shows a reference signal integral expected at the integral of the reference signal R(x) is computed for the nominal extreme of oscillation $x_{MAX}$. The value of the integral of the reference signal at $x_{MAX}$ is defined as the predetermined value "A", here designated $A_R$ since it corresponds to the rightward portion of the reference signal R(x). $A_R$ therefore is the predetermined value to which $I_R(x)$ is compared for each data sample taken until there is substantial equality.

It will be understood that the foregoing technique is also applied in computing $A_L$ based upon the leftward portion of the reference signal R(x).

Turning now to FIG. 12, the steps required to implement the integrated area reference signal approach in the preferred embodiment will be described. It will be understood that microprocessor 61 is programmed to accomplish the steps in the method illustrated.

Figure 12A:
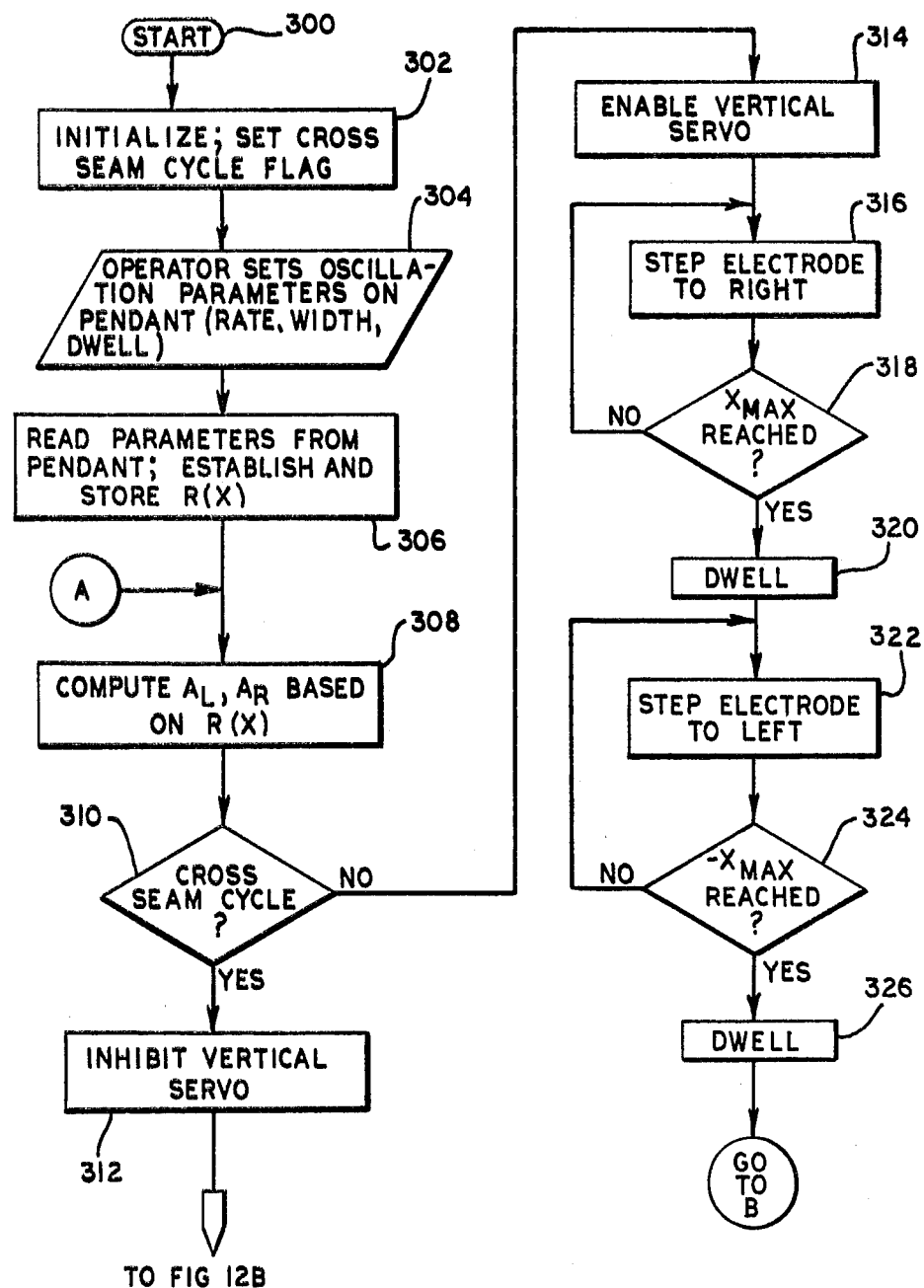
FIGS. 12A-12B are flowchart diagrams of the general operation of the preferred embodiment when employing the integrated area reference signal processing approach.
Figure 12B:
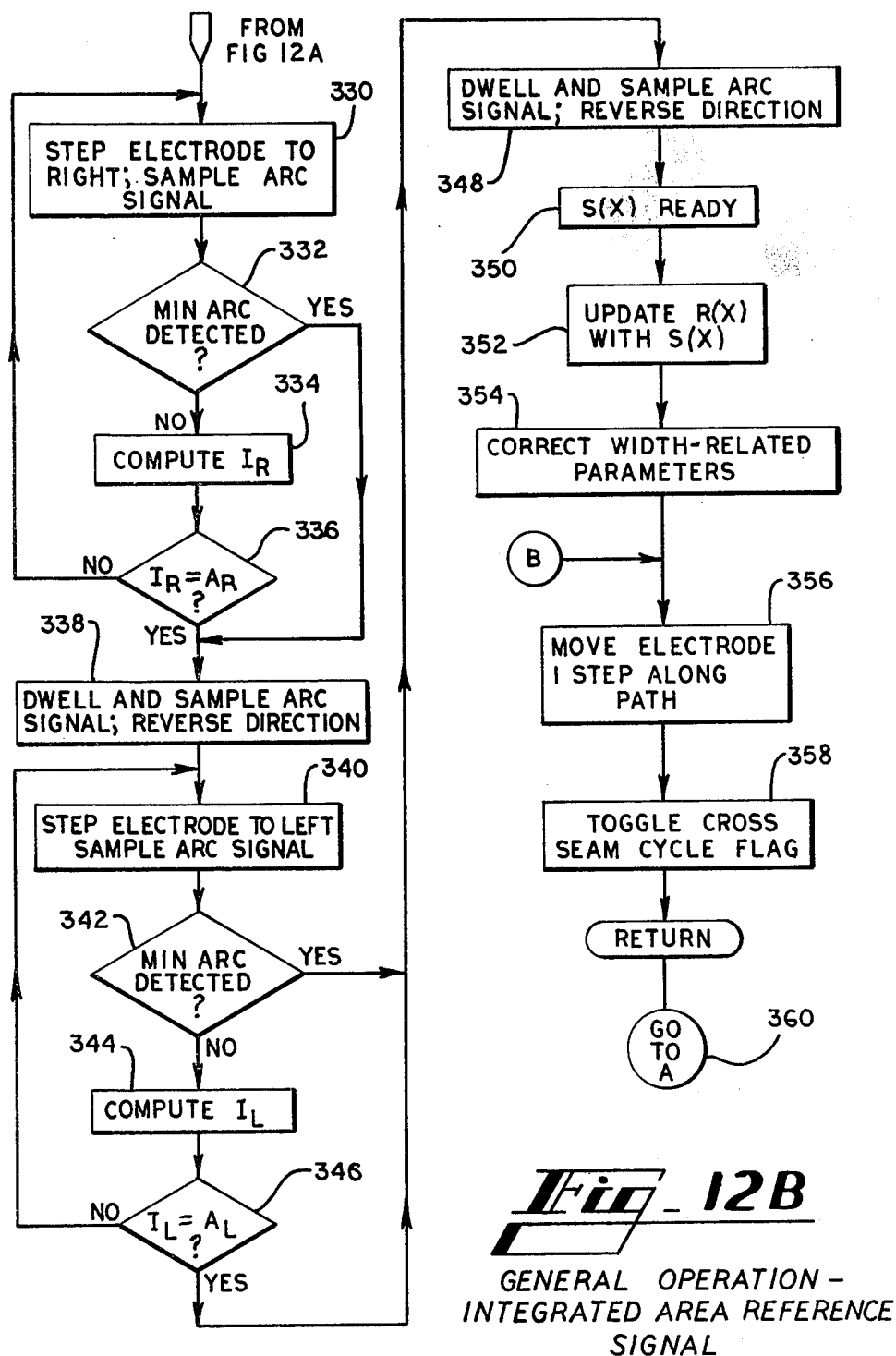

FIGS. 12A–12B are flow diagrams which may be used to implement the above-described "integrated area reference signal" approach to signal processing.

Entering at block 300, the first tasks accomplished at 302 and 304 are identical to the steps shown at 241 and 242 in FIG. 8A. At 306, the parameters are read from the operator control pendant, and the reference signal R(x) is stored in memory. Techniques for obtaining the reference signal are discussed above.

At 308, the predetermined values of "A" are computed. In particular, the value of $A_L$ is computed based on the leftward portion of R(x) from $x_o$ to $-x_{MAX}$ of the reference data, and $A_R$ is computed based on the rightward portion of R(x) from $x_o$ to $x_{MAX}$. These values are stored for further computations.

At 310, if the present oscillation is a cross-seam cycle, the vertical position servo mechanism will be inhibited at 312 so that accurate data may be obtained.

If a cross-seam cycle is not expected for the current oscillation, the vertical servo mechanism is enabled at 314. Assuming that the present oscillation is not a cross-seam cycle, the electrode is stepped to the right at 316, and at 318 the inquiry is made whether the preset maximum lateral excursion to $x_{MAX}$ has been reached. If not, step 316 is repeated.

When $x_{MAX}$ is reached, the electrode dwells at 320, and then the electrode is stepped to the left at 322 until $-x_{MAX}$ is reached at 324. The electrode dwells at 326, and the program flow then jumps to point B on FIG. 12B. It will be understood that the sequence followed when the oscillation is not a cross-seam cycle merely moves the electrode to the extremes of oscillation which were predetermined.

Assuming now at 310 that the oscillation is a cross-seam cycle, the vertical servo is inhibited at 312, and the next step taken is at 330. The electrode is stepped to the right and a sample is taken of the arc signal. An inquiry is made at 332 whether the min arc is detected. The min arc inquiry here is the same as discussed in connection with FIGS. 8A–8B. If the min arc is not detected, then the value of the integral $I_R$ from $x_o$ to the data sample just taken is computed at 334. At 336, a comparison is made between $I_R$ and $A_R$. If $I_R$ does not substantially equal $A_R$, the program returns to 330 and the rightward movement of the electrode is continued.

If $I_R$ substantially equals $A_R$, or if the min arc is detected, then the extreme of oscillation has been reached, and there is now established a new value of $x_{MAX}$. At 338, the electrode dwells and samples of the arc signal are taken. The direction of oscillation is then reversed, and at 340 the electrode is stepped to the left and a sample is taken of the arc signal. At 342, the inquiry is again made whether the min arc has been encountered. If not, at 344 the integral $I_L$ is computed for the data sample just taken, and at 346 $I_L$ is compared to $A_L$. If $I_L$ does not substantially equal $A_L$, the program returns to 340 and the leftward movement of the electrode is continued.

When $I_L$ substantially equals $A_L$, or if the min arc is detected, the electrode has reached the leftward extent of its movement at 348, the electrode dwells, and samples are taken of the arc signal.

At this time, data corresponding to the entire weld profile is resident in memory, and the signal S(x) corresponding to the weld profile is ready, at 350. At 352, the reference signal R(x) is updated with the data corresponding to S(x). It will be recalled from the discussion above that the preferred technique for combining S(x) with R(x) is to define R(x) as a weighted average of signals S(x) from a predetermined number of prior oscillations. In particular, R(x) at a time $t_n$, where n is the predetermined number of prior oscillations, may be computed according to the following:

$$R(x) @ t_n = \frac{\sum_{i=1}^{n} w_i S_i(x)}{\sum_{i=1}^{n} w_i}$$

EQUATION 7 where $w_i$ represents a weighting factor assigned to the particular signal. Preferably, the data is weighted more heavily in favor of more recent oscillations since data from these oscillations is more accurately representative of the present profile. It will now be understood that each discrete value of R(x) comprises the weighted average of a plurality of discrete values for the same lateral position x taken on a plurality of prior data-gathering oscillations of the electrode. After R(x) is updated to provide a new reference signal, at 354 width-related parameters are corrected, since the width of oscillation has now been determined to fall between the leftmost and rightmost extremes.

At steps 356 and 358, the electrode is moved longitudinally along the path and the cross-seam cycle flag is toggled. The program flow then returns at 360 to point A and the process begins anew.

It will now be apparent that the centerline of oscillation rests intermediate the extremes of oscillation, and that a simple computation will yield the adjustment required to the present center of oscillation for subsequent oscillations. Since the extremes of oscillation are defined as the points at which either the min arc is encountered or $I_R$ equals the predetermined value $A_R$, and where the min arc is detected or $I_L$ equals the predetermined value $A_L$, and oscillation is made to occur between these extremes, simultaneous tracking of the seam and width control is accomplished. It should also be understood that the foregoing technique, which automatically provides for width correction, may be conveniently combined with the other signal processing approaches disclosed herein, since automatic tracking and width correction share many common computations.

The preferred embodiment of the present invention has been disclosed by way of example and it will be understood that other modifications and alterations may occur to those skilled in the art without departing from the scope and the spirit of the appended claims.

We claim:

1. In an apparatus for arc welding a joint in a workpiece, said apparatus including arc cross-seam moving means for oscillating an electrode laterally across the joint about a predetermined center reference point between a left extreme and a right extreme, the improvement comprising: noncontacting means for sensing the lateral profile of the joint by periodically holding the electrode vertically stationary while the electrode is moving laterally across the joint between and including said extremes of oscillation and for obtaining data representative of the weld joint lateral profile between said extremes;

means for comparing a first portion of said representative weld joint lateral profile data to a second portion of said representative weld joint lateral profile data and for providing an error signal as a function of the difference between said first and said second portions; and means responsive to said error signal for adjusting a welding parameter.

2. In an apparatus for arc welding a joint in a workpiece, the apparatus including arc cross-seam moving means for oscillating an arc electrode laterally across the joint about a predetermined center reference point between a left extreme and a right extreme, the improvement comprising:

(a) arc parameter measuring means for providing an arc signal having a magnitude related to the distance between the electrode and the surface of the joint as the electrode moves laterally across the joint between said extremes;

(b) noncontacting means for sensing the lateral profile of the joint by periodically holding the electrode vertically stationary and for providing lateral profile data comprising a plurality of samples of said arc signal;

(c) memory means for storing said lateral profile data;

(d) signal processing means for providing an error signal based upon a computed difference between a first portion of said lateral profile data and a second portion of said lateral profile data; and (e) control means responsive to said error signal for adjusting a welding parameter to reduce said error signal, whereby said computed difference is reduced between said first portion and said second portion of said lateral profile data.

3. The improvement of claim 2, wherein said lateral profile data comprises a predetermined number of discrete values.

4. The improvement of claim 3, wherein said sensing means, said memory means, and said signal processing means comprise:

conversion means for converting said arc signal into digital signals representative of said lateral profile data;

digital memory means for storing said digital signals; and programmed digital computing means operative to compute said difference and further operative to compute said error signal.

5. The improvement of claim 1 or 2, further comprising selectively operable automatic vertical control means for controlling the vertical distance between the electrode and the surface of the joint, and wherein said vertical control means is operative for a predetermined portion of a path of travel of the electrode in a plane perpendicular to the axis of the electrode.

6. The improvement of claim 5, wherein said predetermined portion of said path comprises every other oscillation of the electrode.

7. The improvement of claim 5, wherein said path comprises a first plurality of oscillations of said electrode, and wherein said predetermined portion of said path comprises a predetermined number of oscillations of said electrode.

8. The improvement of claim 5, wherein said path comprises a single oscillation of said electrode.

9. The improvement of claim 1 or 2, further comprising indicator means for providing a visual indication to an operator that said welding parameter is being adjusted.

10. The improvement of claim 9, wherein said welding parameter adjusted by said control means comprises the location of said predetermined center reference point with respect to the centerline of the joint, and wherein said indicator means comprises right correction indicator means for indicating that adjustment is being made in a first direction and left correction indicator means for indicating that adjustment is being made in a second direction.

11. The improvement of claim 1 or 2, further comprising in-range indicator means for providing a visual indication to an operator that the electrode is within a predetermined vertical distance from the workpiece.

12. The improvement of claim 1 or 2, further comprising communication means for providing a recentering signal from an outside source, and wherein said control means is responsive to said recentering signal to place the electrode in a predetermined position.

13. In an apparatus for arc welding a joint in a workpiece including arc cross-seam moving means for oscillating an electrode laterally across the joint about a predetermined center reference point between a left extreme and a right extreme, the improvement comprising:
(a) arc parameter measuring means for providing an arc signal having a magnitude related to the distance between the electrode and the surface of the joint between said extremes;
(b) selectively operable electrode vertical moving means for periodically holding the electrode vertically stationary while the electrode moves laterally across the joint;
(c) first means for accumulating a first plurality of samples of said arc signal during the movement of the electrode laterally in a first direction with respect to said predetermined center reference point towards a sidewall of the joint and while the electrode is held vertically stationary
(d) second means for accumulating a second plurality of samples of said arc signal during the movement of the electrode laterally in a second direction with respect to said predetermined center reference point towards a sidewall of the joint and while the electrode is held vertically stationary;
(e) signal processing means for processing said first plurality of samples and said second plurality of samples and for providing a correction signal based on a mathematical function of said first plurality of samples and said second plurality of samples; and
(f) means responsive to said correction signal for adjusting a welding parameter.

14. The improvement of claim 13, wherein said first and second accumulating means and said signal processing means comprise:
conversion means for converting said arc signal into a first set of digital data representative of said first plurality of samples and a second set of digital data representative of said second plurality of samples;
memory means for storing said first set of digital data and said second set of digital data; and
programmed digital computing means operative for computing a first sum corresponding to the summed magnitudes of said first set of digital data during a first time period, said first time period including the period during which the electrode is moving laterally in said first direction,
said computing means being further operative for computing a second sum corresponding to the summed magnitudes of said second set of digital data during a second time period, said second time period including the period during which the electrode is moving laterally in said second direction, and
said computing means being further operative for computing and mathematical function based on said first sum and said second sum and for providing said correction signal.

15. The improvement of claim 14, wherein said mathematical function of said first sum and said second sum comprises a function of a first average value and a second average value, said first average value comprising an average of said arc signal during said first time period and said second average value comprising an average of said arc signal during said second time period;
wherein said first time period comprises a time period which begins when the electrode is at a first predetermined distance from said center reference point and ends after the electrode has dwelled for a predetermined dwell time at an extreme of oscillation a second predetermined distance from said center reference point;
wherein said second time period comprises a time period which begins when the electrode is at a third predetermined distance from said center reference point and ends after the electrode has dwelled for a predetermined dwell time at an extreme of oscillation a fourth predetermined distance from said center reference point; and
wherein said correction signal comprises a signal proportional to the difference between said first average value and said second average value.

16. The improvement of claim 14, wherein said mathematical function of said first sum and said second sum comprises a function of a first integral value and a second integral value, said first integral value being computed as a summed approximation of the integral of said arc signal during said first time period and said second integral value being computed as a summed approximation of said arc signal during said second time period;
wherein said first time period comprises a time period which begins when the electrode is at a first predetermined distance from said center reference point and ends after the electrode has dwelled for a predetermined dwell time at an extreme of oscillation a second predetermined distance from said center reference point;
wherein said second time period comprises a time period which begins when the electrode is at a third predetermined distance from said center reference point and ends after the electrode has dwelled for a predetermined dwell time at an extreme of oscillation a fourth predetermined distance from said center reference point; and
wherein said correction signal comprises a signal proportional to the difference between said first integral value and said second integral value.

17. The improvement of claim 14, wherein said memory means stores a set of reference profile data comprising a plurality of digital signals corresponding to a plurality of first digital signals and second digital signals accumulated during a plurality of prior oscillations of the electrode;

wherein said function of said first sum and said second sum comprises a first integral value and a second integral value, respectively, said first integral value comprising a summed approximation of the integral of said arc signal during said first time period, said first time period beginning when the electrode is a first predetermined distance from said center reference point, said second integral value comprising a summed approximation of the integral of said arc signal during said second time period, said second time period begining when the electrode is a second predetermined distance from said center reference point;

wherein said first extreme is reached when said first integral value substantially equals a first reference value;

wherein said second extreme is reached when said second integral value substantially equals a second reference value;

wherein said first reference value comprises a nominal integral value computed as a summed approximation of said first digital signals of said reference profile data; and wherein said second reference value comprises a nominal integral value computed as a summed approximation of said second digital signals of said reference profile data.

18. The improvement of claim 17, wherein said reference profile data comprises an average of a plurality of said first digital signals and of said second digital signals from a plurality of prior oscillations of the electrode.

19. In an apparatus for arc welding a joint in a workpiece including arc cross-seam moving means for oscillating an electrode laterally across the joint about a predetermined center reference point between a left extreme and a right extreme, the improvement comprising:

means for obtaining data representative of the leftward portion of the lateral profile of the joint while the electrode is held vertically stationary and while the electrode is moving laterally in a first direction with respect to said center reference point toward said left extreme;

means for obtaining data representative of the rightward portion of the lateral profile of the joint while the electrode is held vertically stationary and while the electrode is moving laterally in a second direction opposite said first direction toward said right extreme;

means for comparing said leftward portion data and said rightward portion data and for generating an error signal; and control means responsive to said error signal for adjusting a welding parameter.

20. An adaptive control apparatus for arc welding a joint in a workpiece with an arc welding electrode, comprising:

(a) means for periodically holding the electrode vertically stationary;

(b) arc parameter measuring means for providing an arc position signal having a magnitude related to the distance between the electrode and the surface of the joint while the electrode is held vertically stationary;

(c) arc cross seam moving means for moving the electrode laterally across the joint;

(d) first averaging means for averaging the magnitude of said position signal during the movement of the electrode laterally in a first direction with respect to a preselected center reference point towards a preselected first extreme of movement, said first averaging means providing a first average;

(e) second averaging means for averaging the magnitude of said position signal during the movement of the electrode laterally in a second direction with respect to said reference point towards a second preselected extreme of movement, said second averaging means providing a second average;

(f) means for comparing said first average and said second average and for providing a correction signal related to the difference between said first average and said second average; and (g) control means responsive to said correction signal for adjusting a welding parameter.

21. An adaptive control apparatus for arc welding a joint in a workpiece with an arc welding electrode, comprising:

(a) means for periodically holding the electrode vertically stationary;

(b) arc parameter measuring means for providing an arc position signal having a magnitude related to the distance between the electrode and the surface of the joint while the electrode is held vertically stationary;

(c) arc cross seam moving means for moving the electrode laterally across the joint;

(d) first integrating means for integrating said position signal while the electrode is moving laterally in a first direction with respect to a preselected center reference point towards a first extreme of movement and for providing a first integral;

(e) second integrating means for integrating said position signal while the electrode is moving laterally in a second direction with respect to said reference point towards a second extreme of movement and for providing a second integral;

(f) means for comparing said first integral and said second integral and for providing a correction signal related to the difference between said first integral and said second integral; and (g) control means responsive to said correction signal for adjusting a welding parameter.

22. The improvement of claim 19, 20, or 21 wherein said welding parameter adjusted by said control means comprises the location of said predetermined center reference point with respect to the centerline of the joint.

23. The improvement of claim 19, 20, or 21 wherein said welding parameter adjusted by said control means comprises the width of oscillation of the electrode about said predetermined reference point.

24. The improvement of claim 19, 20, or 21 wherein said welding parameter adjusted by said control means comprises the wire feed rate of a consumable electrode for constant fill control.

25. An adaptive control apparatus for arc welding a joint in a workpiece with an arc welding electrode, comprising:

(a) means for periodically holding the electrode vertically stationary;

(b) arc parameter measuring means for providing an arc position signal having a magnitude related to the distance between the electrode and the surface of the joint while the electrode is held vertically stationary;

(c) oscillation means for oscillating the electrode laterally across the joint about a center reference point in a first direction and an opposite second direction;

(d) integrating means for providing an integral signal corresponding to the integral of said arc position signal during a predetermined time period which begins when the electrode is a first predetermined distance from said center reference point;

(e) comparing means for comparing said integral signal to a reference value, said reference value being related to stored reference data, said comparing means being responsive to provide a reversal signal when said integral signal substantially equals said reference value;

(f) oscillation reversal means responsive to said reversal signal for causing said oscillation means to cease moving the electrode in said first direction and to begin moving the electrode in said second direction;

(g) memory means for storing said reference data, said reference data comprising a plurality of arc position signals from a plurality of prior oscillations of the electrode; and (h) reference value computing means for providing said reference value based on said stored reference data.

26. The apparatus of claim 25, wherein said reference value comprises a value related to the integral of said reference data.

27. The apparatus of claim 25 or 26, wherein said reference data comprises an average of a predetermined number of arc signals accumulated during a predetermined number of prior oscillations of the electrode.

* * * * *